US012793156B2

(12) United States Patent
Sanchez et al.

(10) Patent No.: US 12,793,156 B2
(45) Date of Patent: Nov. 10, 2026

(54) SMART SENSOR SYSTEM AND METHOD FOR THREAT DETECTION AND RESPONSE BASED ON DETECTION OF A VOCAL PHRASE

(71) Applicant: Wytec International, Inc., San Antonio, TX (US)

(72) Inventors: Robert Sanchez, San Antonio, TX (US); Arthur Salindong, San Diego, CA (US); David Sathiaraj, San Diego, CA (US); Nicholas Woolsey, San Diego, CA (US); Samson Rafi Moldovsky, San Diego, CA (US); Andres Tec, San Diego, CA (US); Cathy Hsieh, San Diego, CA (US)

(73) Assignee: Wytec International, Inc., San Antonio, TX (US)

( * ) Notice: Subject to any disclaimer, the term of this patent is extended or adjusted under 35 U.S.C. 154(b) by 0 days.

(21) Appl. No.: 19/092,824

(22) Filed: Mar. 27, 2025

(65) Prior Publication Data

US 2025/0225601 A1 Jul. 10, 2025

Related U.S. Application Data

(62) Division of application No. 18/902,824, filed on Sep. 30, 2024, now Pat. No. 12,271,971.

(Continued)

(51) Int. Cl.
*G06Q 10/10* (2023.01)
*G06Q 40/08* (2012.01)

(Continued)

(52) U.S. Cl.
CPC ............ *G06Q 50/265* (2013.01); *G10L 25/21* (2013.01); *G10L 25/30* (2013.01); *G10L 25/51* (2013.01)

(58) Field of Classification Search
CPC ....... G06Q 50/265; G10L 25/21; G10L 25/30; G10L 25/51

(Continued)

(56) References Cited

U.S. PATENT DOCUMENTS 5,745,856 A 4/1998 Dent ........................ H03G 5/24 455/340
8,779,921 B1 7/2014 Curtiss (Continued)

OTHER PUBLICATIONS

Doukas, Charalampos & Athanasiou, Lampros & Fakos, Kostantinos & Maglogiannis, Ilias. (2009). Advanced sound and distress speech expression classification for human status awareness in assistive environments. The Journal on Information Technology in Healthcare. 7. 111-117. (Year: 2009).*

(Continued)

*Primary Examiner* — Jonathan P Ouellette
(74) *Attorney, Agent, or Firm* — Dentons US LLP; Derek Auito

(57) ABSTRACT

A threat detection and response system including at least one sound sensor configured to sense sound within a detection zone and transmit sound data corresponding to the sensed sound. A system gateway including a processor configured to receive the sound data, analyze the sound data to detect a vocal phrase within the sensed sound, determine that the detected vocal phase corresponds to a pre-defined vocal phrase associated with a threat, and communicate an existence of the threat to a recipient device.

20 Claims, 9 Drawing Sheets

Related U.S. Application Data

(60) Provisional application No. 63/542,456, filed on Oct. 4, 2023.

(51) Int. Cl.
*G06Q 50/26* (2012.01)
*G10L 25/21* (2013.01)
*G10L 25/30* (2013.01)
*G10L 25/51* (2013.01)

(58) Field of Classification Search
USPC ........................................... 705/1.1–912, 325
See application file for complete search history.

(56) References Cited

U.S. PATENT DOCUMENTS

| | | | | |
|---|---|---|---|---|
| 9,135,797 | B2 | 9/2015 | Couper | G08B 25/08 |
| 9,396,632 | B2 * | 7/2016 | Brav | G08B 29/188 |
| 10,909,830 | B1 * | 2/2021 | Stapleford | H04W 4/90 |
| 11,182,489 | B2 * | 11/2021 | Kochura | G06F 40/30 |
| 11,581,099 | B1 * | 2/2023 | Rufo | G16H 20/13 |
| 11,948,599 | B2 * | 4/2024 | Shiloh Perl | G10L 25/45 |
| 2015/0161877 | A1 | 6/2015 | Hamalainen et al. | |
| 2016/0071517 | A1 * | 3/2016 | Beaver | G06F 40/35 704/9 |
| 2016/0142894 | A1 | 5/2016 | Papakonstantinou et al. | |
| 2017/0301220 | A1 | 10/2017 | Jarrell et al. | |
| 2018/0306609 | A1 | 10/2018 | Agarwal | G06N 20/10 |
| 2018/0310159 | A1 * | 10/2018 | Katz | H04M 3/42161 |
| 2020/0302951 | A1 | 9/2020 | Deng et al. | |
| 2020/0411003 | A1 | 12/2020 | Gordon et al. | |
| 2021/0027602 | A1 * | 1/2021 | Correnti | G08B 13/1672 |
| 2021/0158685 | A1 * | 5/2021 | Bernotas | G08B 17/12 |
| 2022/0014895 | A1 * | 1/2022 | Horelik | G08B 21/0261 |
| 2022/0165297 | A1 * | 5/2022 | Wang | G10L 15/142 |
| 2023/0060936 | A1 * | 3/2023 | Thiruvenkatanathan | G10L 25/21 |
| 2023/0147573 | A1 | 5/2023 | Chien | G06V 40/168 705/7.34 |
| 2023/0210372 | A1 * | 7/2023 | Alam | A61B 5/6898 340/286.07 |
| 2023/0215460 | A1 | 7/2023 | Shiloh Perl | G10L 25/93 704/200 |
| 2023/0260387 | A1 * | 8/2023 | Latham | G08B 23/00 340/517 |
| 2024/0038222 | A1 * | 2/2024 | Chaar | G06Q 10/1095 |
| 2024/0112568 | A1 * | 4/2024 | Garcia | B60W 60/0015 |
| 2025/0046333 | A1 * | 2/2025 | Graciarena | G10L 25/30 |

OTHER PUBLICATIONS

Arslan et al., "Detection and Recognition of Sounds from Hazardous Events for Surveillance Applications," Dec. 2018, Abstract, p. 31, para 3; p. 14, para 2; p. 25, para 7; p. 31, para 3; p. 52, para 1, p. 31, para 3; p. 14, para 2; p. 25, para 7, p. 31, para 3; p. 52, para1.
Grane et al., "Gunshot Detection from Audio Steams in Portable Devices," Jun. 17, 2022, p. 10, para 4.

* cited by examiner

SMART SENSOR SYSTEM AND METHOD FOR THREAT DETECTION AND RESPONSE BASED ON DETECTION OF A VOCAL PHRASE

CROSS-REFERENCE TO RELATED APPLICATIONS

This patent application is a divisional application of U.S. Ser. No. 18/902,824, filed on Sep. 30, 2024, which claims priority to U.S. Provisional Application No. 63/542,456, filed on Oct. 4, 2023, which are incorporated by reference herein in their entirety.

TECHNICAL FIELD

The present disclosure relates generally to threat detection and more specifically, in some embodiments, to a smart sensor for threat detection.

BACKGROUND

Traditional firearm discharge detection systems are commonly segregated in two aspects, those used for indoor purposes and those better suited for outdoor use. As such, given the challenges presented by each particular environment, the sensors and means with which the gunshot "bang" detection is achieved is directly affect by the extent to which the sensor (typically acoustic) is positioned/distributed in terms of its embedded nature into the environment.

In the outdoor case, it is possible to elevate the sensing nodes such that these have direct line-of-sight (e.g., direct line-of acoustic-sight) of one another. By having such sensors in a common direct sensing plane/field, the geometric composition of the landscape below the sensors and the wave propagation "bouncing" effects of the gun-shot sound signature is better managed as the strength of the acoustic hit alone, in its given initial time scale, can be isolated and triangulated by the sensing network. In addition, the outdoor firearm discharge sensors are designed for an audible capacity spanning a longer, far afield, capacity.

In the indoor case, the distributed sensing network cannot benefit from a "birds-eye acoustic view" of the coverage area. Instead, the sensors are installed and positioned inherently within the environment, such as in corridors and large capacity rooms. As a direct result of the propagation effects of the gunshot sound spike, the embedded sensors do not triangulate a source location and rather report the "shots fired" acoustic spikes' location relative to the sensor placement. As such, the sensors create a proximity alert network with a typical report such as "shot fire in the main lobby", or "shot fired by the east wall of the gymnasium", or "shot fired in corridor 1A", and so on.

Another drawback to both indoor and outdoor systems is that auxiliary sensors for authenticating a firearm discharge event may further be limited by the environment. Outdoor systems have overall sensing range issues for auxiliary sensors, and indoor sensors are subject to the cavernous nature of indoor environments along with their multitude of sensor "blind spots".

In view of the above issues, a need exists for improved systems for detecting firearm discharge and other threats.

SUMMARY

The present disclosure solves one or more problems of previous technology by providing improved systems and methods for threat detection, such as through the detection of a firearm discharge. In some embodiments, the present disclosure provides a new cost-effective system that can be easily upgradable, easily scalable, embedded with artificial intelligence (AI) and/or algorithmic computational processing, and interconnected with indoor and outdoor capabilities, such that a network of sensors allow decentralized and/or centralized computational component(s) to perform the real-time, near-time, and/or post action review reporting and/or analysis in support of decision-makers and/or responders to a given shot fired incident and/or chain of incidents. In some embodiments, the multi-sensing, multi-communicating, and autonomous decision-making systems and methods of this disclosure have embedded and/or distributed computational/processing capabilities that substantially obviate one or more of the problems and/or disadvantages of previous threat-detection technology.

In an aspect of the present disclosure, a threat sensing system includes: at least one threat sensing device including a first sensor configured to transmit first sensor data (raw or processed) via a first communication protocol and a second sensor configured to transmit second sensor data (raw or processed) via a second communication protocol that is different than the first communication protocol; and a system gateway including a processor configured to: receive the transmitted first and second sensor data, determine an existence of a threat by processing a probability to give a confidence score based on the first and second sensor data that corresponds to a predetermined known threat, and communicate the existence of the threat to a recipient device with the confidence score that may be above or equal to a threshold value.

According to another aspect of the present disclosure, a method for detecting and communicating a threat includes: collecting, using a first sensor, first sensor data (raw or processed) and transmitting the first sensor data via a first communication protocol; collecting, using a second sensor, second sensor data (raw or processed) and transmitting the second sensor data via a second communication protocol that is different than the first communication protocol; receiving, via a processor of a system gateway, the transmitted first and second sensor data; determining, via the processor, an existence of a threat by processing a probability to give a confidence score based on the first and second sensor data that corresponds to a predetermined known threat; and communicating, via the processor, the existence of the threat to a recipient device with the confidence score that may be above or equal to a threshold value.

According to another aspect of the present disclosure, a method for detecting and communicating a threat includes: receiving, via a system gateway, first sensor data (raw or processed) via a first communication protocol and second sensor data (raw or processed) via a second communication protocol that is different than the first communication protocol; determining an existence of a threat, via the system gateway, by processing a probability to give a confidence score based on at least one of the first and second sensor data; and communicating the existence of the threat to at least one recipient device with the confidence score that may be above or equal to a threshold value.

According to another aspect of the present disclosure, the determining further includes: analyzing a sound waveform from the first sensor data (raw or processed); correlating the sound waveform to a pre-defined noise associated with the threat; assigning the confidence score based on the correlation of the sound waveform to the pre-defined noise; analyzing image data from the second sensor data (raw or processed); correlating the image data whether by human assessment or to a pre-defined image associated with the threat; and updating the confidence score based on the correlation of the image data to the human assessment or pre-defined image.

According to another aspect of the present disclosure, the determining further includes: analyzing vocal phrases from the first sensor data (raw or processed); correlating the vocal phrases to pre-defined phrases corroborated with the threat; assigning the confidence score based on the correlation of the vocal phrase to the pre-defined phrase; analyzing additional vocal phrases from the second sensor data (raw or processed); correlating the additional vocal phrases to pre-defined phrases corroborated with the threat; and updating the confidence score based on the correlation of the vocal phrases.

According to another aspect of the present disclosure, a method includes: receiving, via a system gateway, first sensor data (raw or processed) via a first communication protocol and second sensor data (raw or processed) via a second communication protocol that is different than the first communication protocol; determining an existence of a gunshot, via the system gateway, by processing a probability to give a confidence score based on at least one of the first and second sensor data; and reporting the existence of the gunshot to at least one recipient device with the confidence score that may be above or equal to a threshold value. According to any of the above aspects of the present disclosure, the threat being detected is a gunshot.

In various embodiments, improvements to threat detection and the associated technology may be achieved by the present disclosure. For example, improved threat detection technology may be provided by increasing threat detection confidence scores by correlating the frequency response of acquired sensor data (raw or processed) to unfiltered acoustic sounds. In some cases, improvements to threat detection and the underlying technology are achieved by periodically refining detection algorithms and databases with updated threat detection data and ambient background noises. In some cases, technology improvements for threat detection are achieved by increasing threat detection confidence scores by adjusting settable and retrievable parameters (e.g., thresholds based on signal-to-noise ratio, sound duration, frequency response, reflection values, magnitude, phase, etc.) of threat detection algorithms and databases.

According to an aspect of the present disclosure, a threat sensing system includes at least one threat sensing device that includes a first sensor configured to transmit first sensor data via a first communication protocol and a second sensor configured to transmit second sensor data via a second communication protocol that is different than the first communication protocol. The system includes a system gateway with a processor configured to receive the transmitted first and second sensor data, determine an existence of a threat by processing a probability to give a confidence score based on the first and second sensor data that corresponds to a predetermined known threat, and communicate the existence of the threat to a recipient device when the confidence score is above or equal to a threshold value.

In some embodiments, the at least one threat sensing device further includes at least one processing unit configured to, prior to transmission of the first sensor data and the second sensor data analyze the first sensor data and the second sensor data to detect initial evidence of the existence of the threat, and allow or cause transmission of the first sensor data and the second sensor data after detecting the initial evidence of the existence of the threat.

In some embodiments, the first sensor includes at least one of a motion sensor, a temperature sensor, an image sensor, a light sensor, a sound sensor, a pressure sensor, a gas sensor, a chemical sensor, and a biologic sensor; and the second sensor includes at least one of a motion sensor, a temperature sensor, an image sensor, a light sensor, a sound sensor, a pressure sensor, a gas sensor, a chemical sensor, and a biologic sensor. In some embodiments, the first sensor is different than the second sensor.

In some embodiments, the threat sensing device is mounted inside a structure, the threat sensing system further including a plurality of threat sensing devices distributed within the structure.

In some embodiments, the first and second communication protocols include at least one of Bluetooth, Zigbee, 6LoWPAN, WiFi, Cellular, Modbus, PROFINET, and EtherCAT.

In some embodiments, the first sensor is configured to form a first set of data packets using the first sensor data, wherein the first set of data packets includes a header that describes a first detection event. The second sensor may be configured to form a second set of data packets using the second sensor data, wherein the second set of data packets includes a header that describes a second detection event.

In some embodiments, the predetermined known threat is a gunshot. In some embodiments, the at least one threat sensing device is an edge device. In some embodiments, the system gateway is installed on a utility pole.

In some embodiments, the existence of the threat is communicated to the recipient device via a secure communication protocol. In some embodiments, the secure protocol includes a hard-wired connection.

In some embodiments, the recipient device is an alarm system. In some embodiments, the recipient device is a mobile communication device. In some embodiments, the recipient device is an access control system.

In some embodiments, the threat sensing system is installed indoors. In some embodiments, the indoor installation is in a building. In some embodiments, the building includes any one of a school, a hospital, a residential house, an apartment, a dormitory, a nursing home, a retirement home, an office building, warehouse, a retail store, a church, a government building, a parking garage, a hotel, a casino, an airport, a stadium, or an area that is covered.

In some embodiments, the threat sensing system is installed outdoors. In some embodiments, the outdoor installation is located on a campus, a public environment, a neighborhood, a city landscape, an outdoor recreational area, or a playground. In some embodiments, the threat sensing system is installed on a premises.

According to an aspect of the present disclosure, a method for detecting and communicating a threat includes collecting, using a first sensor, first sensor data and transmitting the first sensor data via a first communication protocol; collecting, using a second sensor, second sensor data and transmitting the second sensor data via a second communication protocol that is different than the first communication protocol; receiving, via a processor of a system gateway, the transmitted first and second sensor data; determining, via the processor, an existence of a threat by processing a probability to give a confidence score based on the first and second sensor data that corresponds to a predetermined known threat; and communicating, via the processor, the existence of the threat to a recipient device when the confidence score is above or equal to a threshold value.

In some embodiments, the first sensor includes at least one of a motion sensor, a temperature sensor, an image sensor, a light sensor, a sound sensor, a pressure sensor, a gas sensor, a chemical sensor, and a biologic sensor; and the second sensor includes at least one of a motion sensor, a temperature sensor, an image sensor, a light sensor, a sound sensor, a pressure sensor, a gas sensor, a chemical sensor, and a biologic sensor. In some embodiments, the first sensor is different than the second sensor.

In some embodiments, the method further includes, prior to transmission of the first sensor data and the second sensor data analyzing the first sensor data and the second sensor data to detect initial evidence of the existence of the threat, and allowing or causing transmission of the first sensor data and the second sensor data after detecting the initial evidence of the existence of the threat.

In some embodiments, the first and second communication protocols include any one of Bluetooth, Zigbee, 6LoWPAN, WiFi, Cellular, Modbus, PROFINET, and EtherCAT.

In some embodiments, the method further includes forming, via the first sensor, a first set of data packets using the first sensor data, wherein the first set of data packets includes a header that describes a first detection event; and forming, via the second sensor, a second set of data packets using the second sensor data, wherein the second set of data packets includes a header that describes a second detection event.

In some embodiments, the predetermined known threat is a gunshot. In some embodiments, the system gateway is installed on a utility pole.

In some embodiments, the existence of the threat is communicated to the recipient device via a secure communication protocol. In some embodiments, the secure protocol includes a hard-wired connection.

In some embodiments, the recipient device is an alarm system. In some embodiments, the recipient device is a mobile communication device. In some embodiments, the recipient device is an access control system.

According to an aspect of the present disclosure, a method for detecting and communicating a threat, includes receiving, via a system gateway, first sensor data via a first communication protocol and second sensor data via a second communication protocol that is different than the first communication protocol; determining an existence of a threat, via the system gateway, by processing a probability to give a confidence score based on at least one of the first and second sensor data; and communicating the existence of the threat to at least one recipient device when the confidence score is above or equal to a threshold value.

In some embodiments, the determining further includes analyzing a sound waveform from the first sensor data; correlating the sound waveform to a pre-defined noise associated with the threat; and assigning the confidence score based on the correlation of the sound waveform to the pre-defined noise.

In some embodiments, the determining further includes analyzing image data from the second sensor data; correlating the image data to a pre-defined image associated with the threat; and assigning the confidence score based on the correlation of the image data to the pre-defined image.

In some embodiments, the determining further includes analyzing a sound waveform from the first sensor data; correlating the sound waveform to a pre-defined noise associated with the threat; assigning the confidence score based on the correlation of the sound waveform to the pre-defined noise; analyzing image data from the second sensor data; correlating the image data to a pre-defined image associated with the threat; and updating the confidence score based on the correlation of the image data to the pre-defined image. In some embodiments, the threat is a gunshot.

According to an aspect of the present disclosure, a method includes receiving, via a system gateway, first sensor data via a first communication protocol and second sensor data via a second communication protocol that is different than the first communication protocol; determining an existence of a gunshot, via the system gateway, by processing a probability to give a confidence score based on at least one of the first and second sensor data; and reporting the existence of the gunshot to at least one recipient device when the confidence score is above or equal to a threshold value.

In some embodiments, the determination further includes analyzing a sound waveform from the first sensor data; correlating the sound waveform to one of a plurality of audio signatures; and assigning the confidence score based on the audio correlation.

In some embodiments, the determination further includes analyzing image data from the second sensor data; correlating the image data to one of a plurality of pre-defined images; and assigning the confidence score based on the image correlation.

In some embodiments, the determination further includes analyzing a sound waveform from the first sensor data; correlating the sound waveform to one of a plurality of audio signatures; assigning the confidence score based on the audio correlation; analyzing image data from the second sensor data; correlating the image data to one of a plurality of pre-defined images; and updating the confidence score based on the image correlation.

In some embodiments, the plurality of audio signatures includes at least any one of the following: a gunshot, an explosion, fireworks, a vehicle backfire, a car horn, an alarm, a loudspeaker, a book dropping on a floor surface, or an event having a sound level greater than at least 60 dB.

In some embodiments, the system gateway determines whether the image data includes a weapon based on the amount of similarity between the image data and features of template objects that represent a weapon. In some embodiments, the system gateway determines whether the image data includes a weapon based a heat signature of the image data exceeding a threshold temperature.

In some embodiments, the plurality of pre-defined images includes at least any one of the following: a gun, a gun type, a weapon, ammunition, smoke, muzzle flash, body features, facial features, people running, clothing, discharge smoke, and dust particles. In some embodiments, the gun type includes at least one of the following: a handgun, a long gun, a rifle, a shotgun, a carbine, an assault rifle, a battle rifle, a sniper rifle, an automatic rifle, a machine gun, a submachine gun, or a personal defense weapon.

In some embodiments, the reporting the existence of the gunshot includes generating a report that includes at least one of the existence of the gunshot, the confidence score, location data derived from at least one of the first or the second sensor data.

In some embodiments, the method further includes requesting, via the system gateway, third sensor data; and updating the confidence score based on the third sensor data. In some embodiments, the updated confidence score based on the third sensor data is below the threshold value, notifying the at least one recipient device that the existence of the gunshot is incorrect. In some embodiments, the third sensor data is received from any one of a motion sensor, a temperature sensor, an image sensor, a light sensor, a sound sensor, a pressure sensor, a gas sensor, a chemical sensor, and a biologic sensor.

According to an aspect of the present disclosure, a threat sensing device includes a first sensor configured to collect first sensor data from a monitored space; a second sensor configured to collect second sensor data from the monitored space; at least one processing unit configured to receive the first sensor data and the second sensor data; analyze the first sensor data and the second sensor data to detect initial evidence of the existence of a threat; after detecting the initial evidence of the existence of the threat: transmit the first sensor data via a first communication protocol; and transmit the second sensor data via a second communication protocol that is different than the first communication protocol, wherein the transmitted first and second sensor data confirm the existence of the threat and initiate a response to the threat.

According to an aspect of the present disclosure, a threat sensing method includes collecting, via a first sensor, first sensor data from a monitored space; collecting, via a second sensor, second sensor data from the monitored space; analyzing the first sensor data and the second sensor data to detect initial evidence of the existence of a threat; after detecting the initial evidence of the existence of the threat: transmitting the first sensor data via a first communication protocol; and transmitting the second sensor data via a second communication protocol that is different than the first communication protocol, wherein the transmitted first and second sensor data confirm the existence of the threat and initiate a response to the threat.

According to an aspect of the present disclosure, a threat detection and response system includes at least one sound sensor configured to sense sound within a detection zone and transmit sound data corresponding to the sensed sound; and a system gateway with a processor configured to receive the sound data; analyze the sound data to detect a vocal phrase within the sensed sound; determine that the detected vocal phrase corresponds to a pre-defined vocal phrase associated with a threat; and communicate an existence of the threat to a recipient device.

In some embodiments, the processor is further configured to determine a confidence score for the threat based on an extent to which the detected vocal phrase is correlated to the pre-defined phrase; and communicate the existence of the threat to the recipient device if the confidence score is greater than a threshold value.

In some embodiments, the processor is further configured to further analyze the sound data to detect one of more additional vocal phrases; determine that at least one of the one or more additional vocal phrases is correlated to the pre-defined phrase associated with the threat; and responsive to determining that at least one of the one or more additional vocal phrases is correlated to the pre-defined phrase associated with the threat, update the confidence score to reflect an increased confidence in the existence of the threat.

In some embodiments, the threat detection and response system further includes a second sensor configured to collect second sensor data from within at least a portion of the detection zone and transmit the second sensor data, wherein the second sensor is a motion sensor, a temperature sensor, an image sensor, a light sensor, a sound sensor, a pressure sensor, a gas sensor, a chemical sensor, or a biologic sensor. The processor is further configured to receive the second sensor data; and update the confidence score based on an extent to which the second sensor data corroborates the existence of the threat.

In some embodiments, the at least one sound sensor is mounted on or inside a structure. In some embodiments, the system gateway is installed on a utility pole. In some embodiments, the existence of the threat is communicated to the recipient device via a secure communication protocol. In some embodiments, the recipient device is an alarm system, a mobile communication device, or an access control system. In some embodiments, the at least one sound sensor is positioned indoors or outdoors.

In some embodiments, the threat detection and response system further includes a processing unit communicatively coupled to the at least one sound sensor, wherein the processing unit is configured to, prior to transmission of the sound data, analyze the sound data to detect initial evidence of the vocal phrase within the sensed sound; and after detecting the initial evidence of the vocal phrase, allow or cause the sound data to be transmitted.

According to an aspect of the present disclosure, a threat detection and response method includes, by one or more processors, receiving sound data from at least one sound sensor configured to sense sound within a detection zone; analyzing the sound data to detect a vocal phrase within the sensed sound; determining that the detected vocal phrase corresponds to a pre-defined vocal phrase associated with a threat; and communicating an existence of the threat to a recipient device.

In some embodiments, the threat detection and response method further includes determining a confidence score for the threat based on an extent to which the detected vocal phrase is correlated to the pre-defined phrase; and communicating the existence of the threat to the recipient device if the confidence score is greater than a threshold value.

In some embodiments, the threat detection and response method further includes further analyzing the sound data to detect one of more additional vocal phrases; determining that at least one of the one or more additional vocal phrases is correlated to the pre-defined phrase associated with the threat; and responsive to determining that at least one of the one or more additional vocal phrases is correlated to the pre-defined phrase associated with the threat, updating the confidence score to reflect an increased confidence in the existence of the threat.

In some embodiments, the threat detection and response method further includes receiving second sensor data from a second sensor configured to collect second sensor data from within at least a portion of the detection zone, wherein the second sensor is a motion sensor, a temperature sensor, an image sensor, a light sensor, a sound sensor, a pressure sensor, a gas sensor, a chemical sensor, or a biologic sensor; and updating the confidence score based on an extent to which the second sensor data corroborates the existence of the threat.

In some embodiments, the at least one of the at least one sound sensors is mounted on or inside a structure. In some embodiments, the existence of the threat is communicated to the recipient device via a secure communication protocol. In some embodiments, the recipient device is an alarm system, a mobile communication device, or an access control system. In some embodiments, the at least one sound sensor is positioned indoors or outdoors.

In some embodiments, the threat detection and response method further includes, prior to transmission of the sound data, analyzing the sound data to detect initial evidence of the vocal phrase within the sensed sound; and after detecting the initial evidence of the vocal phrase, allowing or causing the sound data to be transmitted.

According to an aspect of the present disclosure, a threat detection and response system includes a processor configured to receive sound data generated by at least one sound sensor configured to sense sound within a detection zone; analyze the sound data to detect a vocal phrase within the sensed sound; determine that the detected vocal phrase corresponds to a pre-defined vocal phrase associated with a threat; and communicate an existence of the threat to a recipient device.

According to an aspect of the present disclosure, a threat detection sensor includes at least one sound sensor configured to sense sound within a detection zone; and a processor unit coupled to the at least one sound sensor and configured to receive the sound data; analyze the sound data to detect initial evidence of the vocal phrase within the sensed sound; and after detecting the initial evidence of the vocal phrase, transmit the sound data corresponding to the sensed sound, wherein the transmitted sound data is used to confirm an existence of a threat by confirming that that the vocal phrase is within the sensed sound.

According to an aspect of the present disclosure, a threat detection system includes a memory storing training datasets including threat-positive audio data, threat-negative audio data, and background noise audio data; and instructions to implement a first machine learning model and a second machine learning model. The system includes a processor coupled to the memory and configured to train the first machine learning model to detect an existence of a threat in arbitrary audio data using the threat-positive audio data and the threat-negative audio data; overlay the background noise audio data with the threat-positive audio data to generate overlayed threat-positive audio data; overlay the background noise audio data with the threat-negative audio data to generate overlayed threat-negative audio data; train the second machine learning model to detect the existence of the threat in arbitrary audio data using the overlayed threat-positive audio data and the overlayed threat-negative audio data; following training the first machine learning model and the second machine learning model: receive audio data from one or more sensors positioned in or around a space monitored by the threat detection system; determine, by providing the received audio data to the first machine learning model, a first confidence score that the threat is detected in the space; determine, by providing the received audio data to the second machine learning model, a second confidence score that the threat is detected in the space; and communicate the existence of the threat to a recipient device based on at least one of the first and second confidence scores.

In some embodiments, the threat detection system further includes an audio sensor configured to record real-world background noise data in the space monitored by the threat detection system, wherein the processor is further configured to overlay the real-world background noise data with the threat-positive audio data to generate space-specific threat-positive audio data; overlay the real-world background noise data with the threat-negative audio data to generate space-specific threat-negative audio data; and retrain the second machine learning model to detect the existence of the threat in arbitrary audio data using the space-specific threat-positive audio data and the space-specific threat-negative audio data.

In some embodiments, the memory is further configured to store instructions to implement a third machine learning model, and the processor is further configured to determine signal-to-noise ratio characteristics of the overlayed threat-positive audio data and the overlayed threat-negative audio data; train the third machine learning model to detect the existence of the threat in arbitrary audio data using the overlayed threat-positive audio data, the overlayed threat-negative audio data, and signal-to-noise ratio characteristics; determine, by providing the received audio data to the third machine learning model, a third confidence score that the threat is detected in the space; and communicate the existence of the threat to the recipient device based on one or more of the first, second, and third confidence scores. In some embodiments, the third machine learning model is a support vector machine (SVM) model.

In some embodiments, the processor is further configured to: filter a portion of the received audio data with a signal-to-noise ratio below a threshold value to generate filtered audio data; determine, by providing the filtered audio data to the third machine learning model, a fourth confidence score that the threat is detected in the space; and communicate the existence of the threat to the recipient device based on one or more of the first, second, third, and fourth confidence scores.

In some embodiments, the threat-positive audio data includes recorded sounds of known firearm discharges. In some embodiments, the threat-negative audio data includes recorded sounds known not to be firearm discharges. In some embodiments, the background noise audio data includes sounds from the space monitored by the threat detection system when the threat is known not to exist.

In some embodiments, the one or more sensors are configured to detect and record sounds in the space monitored by the threat detection system. In some embodiments, the first machine learning model is a convolutional neural network (CNN) model and the second machine learning model is a support vector machine (SVM) model.

According to an aspect of the present disclosure, a threat detection method includes storing, in a memory of a threat detection system: training datasets including threat-positive audio data, threat-negative audio data, and background noise audio data and instructions to implement a first machine learning model and a second machine learning model; training the first machine learning model to detect an existence of a threat in arbitrary audio data using the threat-positive audio data and the threat-negative audio data; overlaying the background noise audio data with the threat-positive audio data to generate overlayed threat-positive audio data; overlaying the background noise audio data with the threat-negative audio data to generate overlayed threat-negative audio data; training the second machine learning model to detect the existence of the threat in arbitrary audio data using the overlayed threat-positive audio data and the overlayed threat-negative audio data; following training the first machine learning model and the second machine learning model: receiving audio data from one or more sensors positioned in or around a space monitored by the threat detection system; determining, by providing the received audio data to the first machine learning model, a first confidence score that the threat is detected in the space; determining, by providing the received audio data to the second machine learning model, a second confidence score that the threat is detected in the space; and communicating the existence of the threat to a recipient device based on at least one of the first and second confidence scores.

In some embodiments, the threat detection method further includes receiving real-world background noise data from the space monitored by the threat detection system; overlaying the real-world background noise data with the threat-positive audio data to generate space-specific threat-positive audio data; overlaying the real-world background noise data with the threat-negative audio data to generate space-specific threat-negative audio data; and retraining the second machine learning model to detect the existence of the threat in arbitrary audio data using the space-specific threat-positive audio data and the space-specific threat-negative audio data.

In some embodiments, the threat detection method further includes storing, in the memory, instructions to implement a third machine learning model; determining signal-to-noise ratio characteristics of the overlayed threat-positive audio data and the overlayed threat-negative audio data; training the third machine learning model to detect the existence of the threat in arbitrary audio data using the overlayed threat-positive audio data, the overlayed threat-negative audio data, and signal-to-noise ratio characteristics; determining, by providing the received audio data to the third machine learning model, a third confidence score that the threat is detected in the space; and communicating the existence of the threat to the recipient device based on one or more of the first, second, and third confidence scores. In some embodiments, the third machine learning model is a support vector machine (SVM) model.

In some embodiments, the threat detection method further includes filtering a portion of the received audio data with a signal-to-noise ratio below a threshold value to generate filtered audio data; determining, by providing the filtered audio data to the third machine learning model, a fourth confidence score that the threat is detected in the space; and communicating the existence of the threat to the recipient device based on one or more of the first, second, third, and fourth confidence scores.

In some embodiments, the threat detection method further includes the threat-positive audio data includes recorded sounds of known firearm discharges. In some embodiments, the threat detection method further includes the threat-negative audio data includes recorded sounds known not to be firearm discharges. In some embodiments, the threat detection method further includes the background noise audio data includes sounds from the space monitored by the threat detection system when the threat is known not to exist.

In some embodiments, the threat detection method further includes the one or more sensors are positioned and configured to detect and record sounds in the space monitored by the threat detection system. In some embodiments, the threat detection method further includes the first machine learning model is a convolutional neural network (CNN) model and the second machine learning model is a support vector machine (SVM) model.

According to an aspect of the present disclosure, a threat detection system includes a processor configured to receive a stream of audio data from one or more sensors positioned in or around a space monitored by the threat detection system; extract a portion of the stream of audio data; determine a signal characteristic of the portion of the stream of audio data; determine, based on the signal characteristic, that the portion of the stream of audio data is compatible with a first machine learning model; responsive to determining that that the portion of the stream of audio data is compatible with the first machine learning model, determine a first confidence score for an existence of a threat in the space by providing the portion of the stream of audio data to a first machine learning model; determine a second confidence score by providing the portion of the stream of audio data, the signal characteristic, and the first confidence score to a second machine learning model; detect the existence of the threat based on based on at least one of the first and second confidence scores; and communicate the existence of the threat to a recipient device.

In some embodiments, the signal characteristic of the portion of the stream of audio data includes one or more of a signal-to-noise ratio, a power, and a frequency-scaled power. In some embodiments, the processor is configured to determine that the portion of the stream of audio data is compatible with a first machine learning model if signal characteristic is greater than a threshold value.

In some embodiments, the processor is configured to detect the existence of the threat by determining that at least one of the first and second confidence scores are greater than a threshold value or determining that a weighted average of the first and second confidence scores is greater than the same or a different threshold value.

In some embodiments, the processor is configured to, responsive to determining that that the portion of the stream of audio data is not compatible with the first machine learning model, determine that evidence of the threat is not detected in a time period associated with the portion of the stream of audio data.

In some embodiments, the threat is a gunshot. In some embodiments, the recipient device is an alarm system, a mobile communication device, or an access control system. In some embodiments, the one or more sensors are configured to detect and record sounds in the space monitored by the threat detection system. In some embodiments, the first machine learning model is a convolutional neural network (CNN) model and the second machine learning model is a support vector machine (SVM) model.

According to an aspect of the present disclosure, a threat detection method includes receiving a stream of audio data from one or more sensors positioned in or around a space; extracting a portion of the stream of audio data; determining a signal characteristic of the portion of the stream of audio data; determining, based on the signal characteristic, that the portion of the stream of audio data is compatible with a first machine learning model; responsive to determining that that the portion of the stream of audio data is compatible with the first machine learning model, determining a first confidence score for an existence of a threat in the space by providing the portion of the stream of audio data to a first machine learning model; determining a second confidence score by providing the portion of the stream of audio data, the signal characteristic, and the first confidence score to a second machine learning model; detecting the existence of the threat based on based on at least one of the first and second confidence scores; and communicating the existence of the threat to a recipient device.

In some embodiments, the signal characteristic of the portion of the stream of audio data includes one or more of a signal-to-noise ratio, a power, and a frequency-scaled power. In some embodiments, determining that the portion of the stream of audio data is compatible with a first machine learning model includes determining that the signal characteristic is greater than a threshold value.

In some embodiments, detecting the existence of the threat includes determining that at least one of the first and second confidence scores are greater than a threshold value or determining that a weighted average of the first and second confidence scores is greater than the same or a different threshold value.

In some embodiments, the threat detection method further includes, responsive to determining that that the portion of the stream of audio data is not compatible with the first machine learning model, determining that evidence of the threat is not detected in a time period associated with the portion of the stream of audio data. In some embodiments, the threat is a gunshot.

In some embodiments, the recipient device is an alarm system, a mobile communication device, or an access control system. In some embodiments, the one or more sensors are configured to detect and record sounds in the space. In some embodiments, the first machine learning model is a convolutional neural network (CNN) model and the second machine learning model is a support vector machine (SVM) model.

According to an aspect of the present disclosure, a threat detection system includes a processor configured to continuously receive a stream of audio data from one or more sensors positioned in or around a space monitored by the threat detection system; while receiving the stream of audio data, for each of a plurality of partially overlapping portions of the stream of audio data: determine a signal characteristic of the portion of the stream of audio data; determine, based on the signal characteristic, whether the portion of the stream of audio data is compatible with a first machine learning model; if the first portion of the stream of audio data is compatible with the first machine learning model: determine a first confidence score for an existence of a threat in the space by providing the portion of the stream of audio data to a first machine learning model; and determine a second confidence score by providing the portion of the stream of audio data, the signal characteristic, and the first confidence score to a second machine learning model; if the first portion of the stream of audio data is not compatible with the first machine learning model, determine that evidence of the threat is not detected for the portion of the stream of audio data; detect the existence of the threat based on at least one of the first and second for at least one of the plurality of partially overlapping portions of the stream of audio data; communicate the existence of the threat to a recipient device. In some embodiments, the signal characteristic of the portion of the stream of audio data includes one or more of a signal-to-noise ratio, a power, and a frequency-scaled power.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

DETAILED DESCRIPTION

Figure 1:
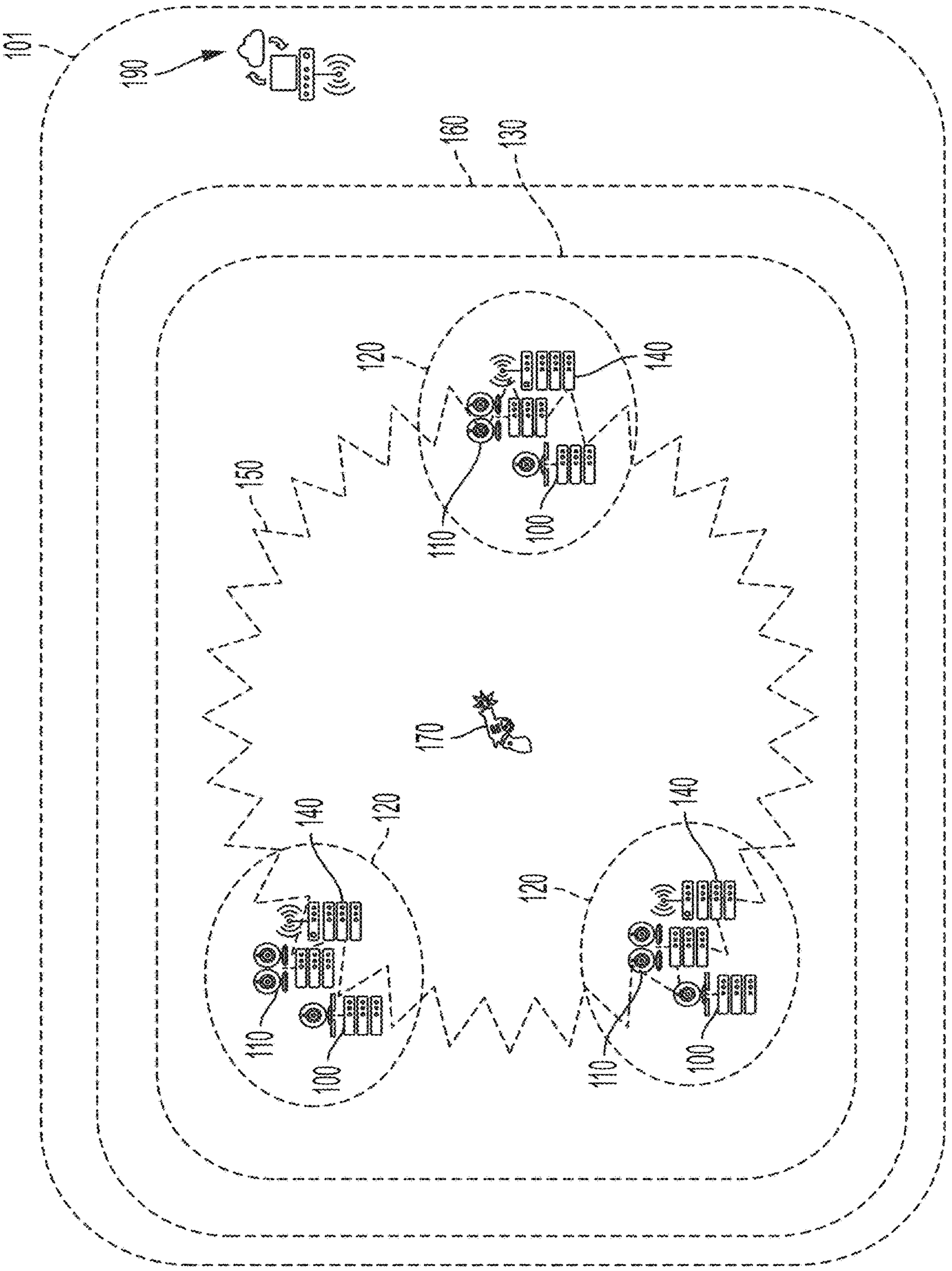
FIG. 1 is an exemplary diagrammatic representation of a threat detection system including sensory, computing, and communication nodes in accordance with the present disclosure.

The following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. The following detailed description is therefore not to be taken in a limiting sense, and the scope of the present disclosure is defined by the appended claims and their equivalents.

In exemplary embodiments described herein, an upgradable system for a multi-sensing, multi-communicating, and autonomous decision-making system having embedded and/or distributed computational capabilities and one or more computing components performing automation and/or autonomy task(s) is provided. As described in more detail below, exemplary embodiments provide a sensing node network and computing system architecture that allows for the ability to easily and quickly upgrade the system to detect one or more firearm discharge(s), originating from a single or multiple weapon types, combined with corroborating data while utilizing a distributed set or clusters of sensing nodes having one or more discrete sensing, computing, communicating, and/or interacting capabilities.

Additionally, in aspects of the present disclosure, there is a method of including one or more embedded computational components, including a centralized or decentralized network of intelligent capacity hardware and software wherein real-time, near-time, and post-time processing of the dataflow is performed in an autonomous and/or automatic manner to generate a feedback reporting capability to the human-in-the-loop. As such, said real-time, near-time, or post processing may additionally occur in a centralized or distributed manner such that the computational load(s), especially those created by an ongoing surge in the sensing stimulus or additional corroborating data, do not cause a partial or system wide failure. The term "stimulus", "sensed stimulus", "sensing stimulus", and so on, are herein defined as an audible event or audible events that have an audio signal having a characteristically large spike in amplitude and/or signal power compared to the baseline and/or calibrated ambient noise of a given environment. The audio signal may also include other audible events or phrases corroborating the stimulus. Additionally, further contained within the scope of the term "stimulus", and specifically related to "(intelligent) stimulus response", is the definition of the signal-to-noise ratio (SNR) threshold(s), wherein such SNR calculation, frequency response correlation, and/or start/end signal duration calculation provide resultant metric(s), such as, but not limited to, signal power, noise power, and so on, that enhances said stimulus detectability by means of, but not limited to, enabling/enhancing confidence or confidence percentage in detectability, identification, localization, calibration, re-calibration, quantification, verification/validation, and/or any form of stimulus signal comparison with one or more present or future dataset(s). These datasets may include one or more foundational and/or driving knowledge for the one or more centralized or decentralized artificial intelligence techniques/processes deployed in the one or more computational components, resulting in machine-based decision making, human-in-the-loop reporting, analysis/analytics, system autonomy, system robustness, system persistence, and/or robotic awareness creation and/or sharing. AS described elsewhere in this disclosure, a stimulus may be referred to as a threat.

The present disclosure may further include a computational load distribution management awareness system to computationally conserve computing allocation to the real-time response features, then the near-term response features, then the post-time processing response features. For example, real-time response may include firearm discharge detection and location, the near-term reporting may include information about the direction of the discharge and direction/progress of the suspect given multiple discharges. A post-time heat map may then be created of the likely areas where shells or other evidentiary material may be located for evidence gathering. In similar fashion, the above is applicable to multiple suspects, multiple firearms, and multiple location(s) of the coverage area where dataflow is generated given the presence of stimulus.

The term stimulus/stimuli is herein additionally generally used and referred to as the sensed activities and/or perception that cause the present system to raise either its own internal alert level, collaborative/regional alert level(s), and/or alert to one or more human-in-the-loop. It is important to note that the term automated refers to those computing processes/codes/codebases/databases that are software-based (including embedded software) primarily and/or mostly utilizing, but not limited to, traditional algorithms, cause-and-effect based responses, and/or setpoint-to-desired-state interactions, or any combinations thereof. Alternatively, the term(s) autonomous/autonomy refer to those computing process-es/codes/codebases/databases that are software-based (including embedded software), reliant on sensing and (robotic/non-robotic) perception dataflows and possibly additional accessible/embedded (trained) data-set(s), where said algorithmic codes/codebases/databases include one or more applications spanning the artificial intelligence algorithmic spectrum and/or capabilities, or any combination thereof. As such, within the definitions of these terms, automation is in part, holistically, or entirely less change tolerant and autonomy/automation is in part, holistically, or entirely change tolerant in its decision-making capacity. As a result, the term "intelligent/intelligence" may refer to the software only (including embedded software) and/or combined hardware/software autonomy/autonomous system having change tolerant decision-making capabilities. Lastly, included in the scope of the present disclosure, the algorithmic stack of the codebase may call upon automation and/or autonomous processes in sequence, in parallel, on-demand, as needed regardless of sequence, and/or by any calling function, agent-in-the-loop (e.g., other robotic/computational assets), and/or human-in-the-loop.

In one aspect of the present disclosure, but not limited to, the threat being detected is a firearm discharge or gunshot having automatic, burst, semi-automatic, and/or any trigger-assisted, dual/double action trigger pull, and/or single action trigger pull firing capability. The term "trigger" referred in the prior sentence is generalized to be whatever means with which the firearm has its firing process initiated, whether involving a human or not, whether mechanical or not, and/or whether having a triggering system utilizing hardware/software capability or not. In a broader sense, the threat being detected may also have other audio-visual-sensory signature(s), with other f forms of triggering mechanisms/agents and/or triggering processes wherein the threat detection system utilizes its intelligent stimulus response capabilities, codebase, and signal-to-noise-ratio analysis capabilities to raise alarm and/or awareness of the event(s).

Example Threat Detection System

FIG. 1 illustrates an exemplar threat detection/sensing system 101 of this disclosure. The threat detection/sensing system 101 includes computational components 100 (e.g., processor(s), memory(ies), and communication interface(s)) used to perform the automation and/or autonomous tasks of the threat detection/sensing system 101. The computational components 100 include sensing node(s) 110 and transmitting/receiving terminal nodes 140. The sensing node(s) 110 are generally configured to sense properties within a coverage/area region, or detection zone 150 of the sensing node(s) 110. For example, the sensing node(s) 110 may sense one or more of motion, temperature, images, light, sound, pressure, presence/amount of one or more gases, presence/amount of one or more chemicals, presence/amount of one or more biological components, or combinations of these within the detection zone 150. For example, the sensing node(s) 110 may include motion sensor(s), a temperature sensor(s), image sensor(s), light sensor(s), sound sensor(s), pressure sensor(s), gas sensor(s), chemical sensor(s), biologic sensor(s), or combinations of these.

The transmitting/receiving terminal nodes 140 are generally in communication with the sensing node(s) 110 and configured to receive information from the sensing node(s) 110 and transmit this information to one or more other devices. In some cases, the transmitting/receiving terminal nodes 140 are integrated with one or more of the sensing node(s) 110. In some cases, the transmitting/receiving terminal nodes 140 include computing resources (e.g., processor(s), memory(ies), and communication interface(s)). In such cases, the transmitting/receiving terminal nodes 140 may act as a system gateway for analyzing information from the sensing node(s) 110 and performing threat detection. In other cases, the transmitting/receiving terminal nodes 140 transmit information from the sensing node(s) 110 to a cloud computing system 190 or one or more other devices, such that the cloud computing system 190 and/or the one or more other devices act as a system gateway for performing threat detection. In yet other cases, threat detection and response operations are distributed amongst one or more of the transmitting/receiving terminal nodes 140 and the cloud computing system 190 (and/or other devices). For example, the transmitting/receiving terminal nodes 140 may be used to perform initial processing operations that are compatible with the sometimes limited processing resources available locally to the transmitting/receiving terminal nodes 140, while other processing tasks that are more resource-intensive and/or less time sensitive are performed by the cloud computing system 190. For example, the transmitting/receiving terminal nodes 140 may detect initial evidence of the existence of a threat (e.g., a loud noise, a noise likely to be a predefined vocal phrase associated with a threat). Data associated with such initial evidence can then be provided to the cloud computing system 190 for further analysis and confirmation of a suspected or possible threat. As such, a system gateway for performing threat detection and response may include one or more of the transmitting/receiving terminal nodes 140, one or more cloud computing systems 190, and/or one or more other computing devices (not shown for conciseness).

In the example of FIG. 1, the computational components 100 are positioned and configured to form a node cluster 120, and the node clusters 120 form a node network 130. In this example, the node network 130 is an entirely or mostly centralized network 160. A detection zone 150 is defined at least in part by the distribution of computational components 100 in a physical space (e.g., based on the position and detection range of the sensing node(s) 110). As described further below, a stimulus 170, such as a firearm discharge, can be detected within the detection zone 150.

The computational components 100 may be contained/distributed (physically) within or in the vicinity of any one or more given sensing node(s) 110 (e.g., threat sensing device(s)) of the node cluster 120 and/or node network 130. Furthermore, said computational components 100 may be located on any one or more data transmitting/receiving terminal nodes 140 of the transmission/communication emitted by any one or more sensing nodes 110. The transmitting/receiving hardware(s) of the transmitting/receiving terminal nodes 140 may be configured in clusters and/or network(s), regardless of communication type and/or modality, in communication with any one or more node locations to define the detection zone 150. Therefore, network 160 may be an entirely or mostly centralized network with an intelligent capacity architecture and with an optional cloud computing system 190, which can provide additional information analysis, processing, storage, distribution, and/or user interface operations. As such, data receiving nodes 140 may carry out most or all of the computational/processing capacity(ies) of the system 101, while these nodes 140 may or may not be configured to perform any form of sensing themselves. The cloud computing system 190 may be a cloud-based server or any distributed collection of computing devices.

Additionally, the coverage area/region or detection zone 150 of a node cluster 120 and/or node network 130 includes the coverage area/footprint (for the 2D case) and/or coverage region/bubble (for the 3D case) such that the sensing hardware of the sensing node(s) 110 may capture stimulus 170. The detection zone 150 may extend beyond the physical footprint of the computational components 100. For example, a node cluster 120 may be able to detect a firearm discharge miles away and well beyond its own intra-network communication capabilities or range.

Figure 2:
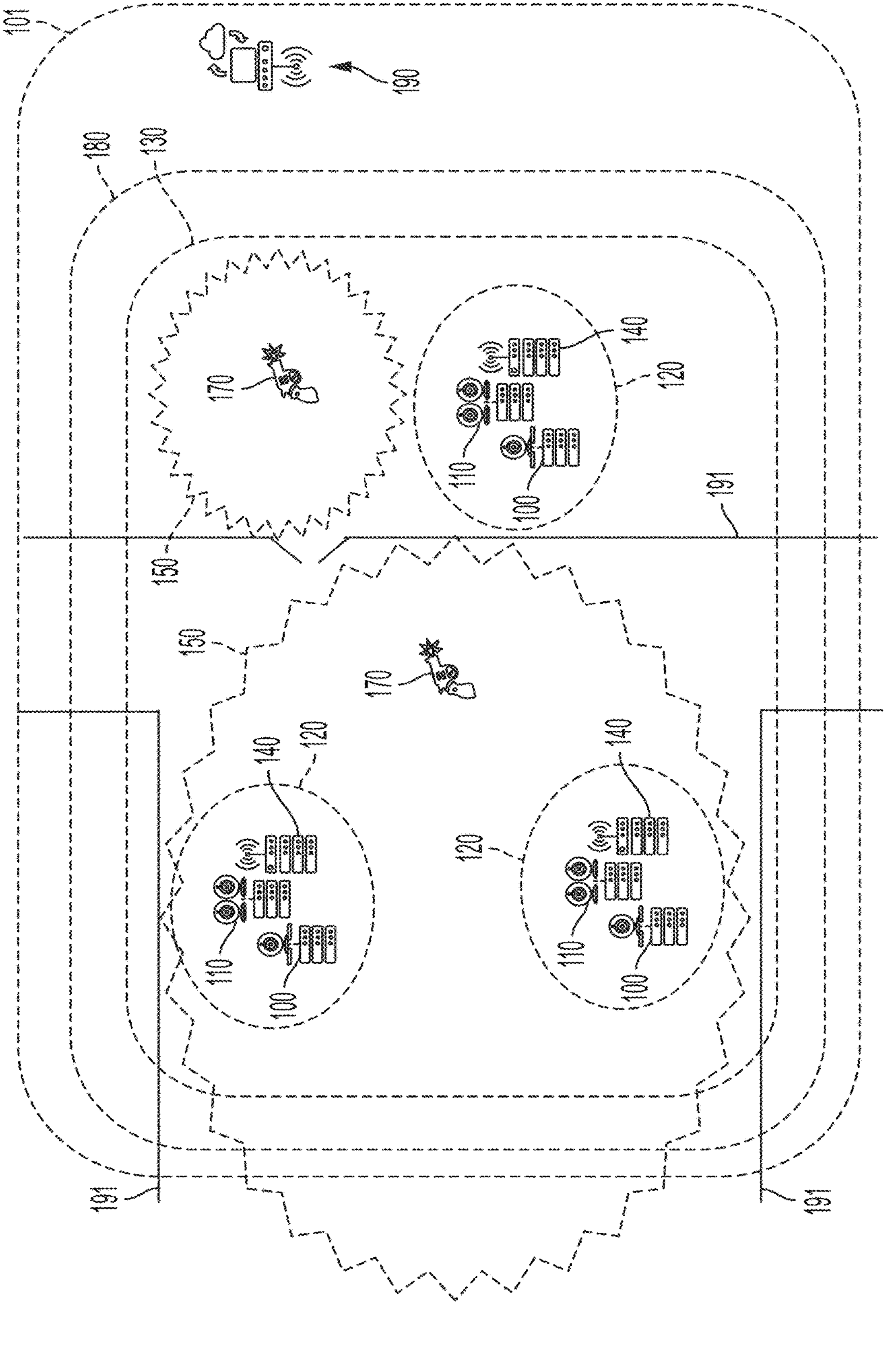
FIG. 2 is an exemplary diagrammatic representation of the system of FIG. 1 configured as a centralized network for threat detection in accordance with the present disclosure.

In another embodiment illustrated in FIG. 2, a node network 130 may be formed by numerous node clusters 120. In this example, the computational components 100 of the node network 130 are installed in various indoor/outdoor locations, whereby a communication-linked region 180 that encompasses the locations of the node clusters 120 spans a larger region than the individual coverage areas or detection zones 150 that can be monitored by the node clusters 120. The node clusters 120 may be operated for indoor and/or outdoor applications.

As shown in FIG. 2, two coverage areas or detection zones 150 are monitored by the threat detection/sensing system 101. The detection zones 150 are separated by physical walls/obstructions 191. The system 101 of FIG. 2 may also benefit from the possible offloading of computational and/or user interface operations via a cloud computing system 190 and/or other off-site computing. The threat detection/sensing system 101 may be installed indoors and/or outdoors. For example, one detection zone 150 may indoors while the other is outdoors.

Figure 3:
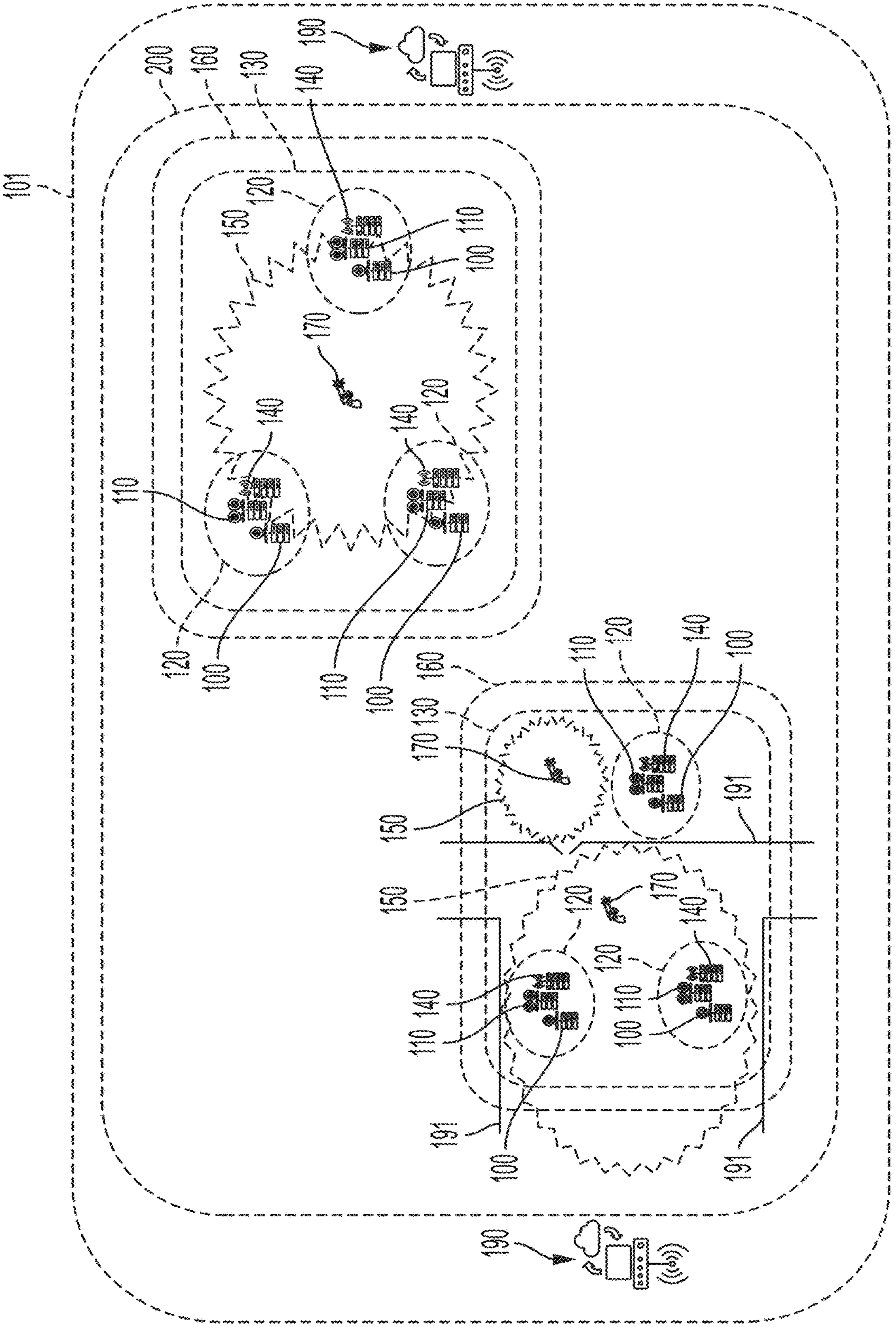
FIG. 3 is an exemplary diagrammatic representation of the system of FIG. 1 configured as a decentralized network for threat detection in accordance with the present disclosure.

Another embodiment of the threat detection/sensing system is illustrated in FIG. 3. In this embodiment, computational components 100 are distributed (e.g., housed/installed) at the transmitting and/or receiving nodes 140 in any fashion and/or any quantity. Wired and/or wireless communication is possible between the nodes 140. Therefore, an entirely or mostly distributed awareness architecture is achieved that provides a decentralized computational architecture 200. As such, any wired or wireless communication technologies, or combinations thereof, may be configured within the system's architecture. Furthermore, transmitting and/or receiving nodes 140, anywhere within the network of nodes, may have access to cloud computing system(s) 190 and/or other control station access for user operability, whereby said control station access may be cloud based and/or based on other terminal devices, such as a computer, tablet, smart device, smart watch, augmented reality system, and so on.

Additionally, the one or more computational components 100 optionally contained within the one or more (sensing) nodes 110, regardless of a given centralized or decentralized architecture, is not impacted or limited by such considerations of the actual transmission parameters and/or specifications of the transmitting nodes 140 themselves, as discussed above. As such, specifications such as, but not limited to, coverage angle, coverage range, orientation, installed height, directionality, and so on are directed to the qualities and performance specifically governing the actual transmission (e.g., communication, link, network implementation, etc.) capacity of the transmitting node(s) 140 and not the embedded computational capacity within the transmitting node(s) 140.

In exemplary embodiments, the one or more nodes 110, 140 of the one or more cluster of nodes and/or network may be equipped with an integrated alternating current (AC) power module. The design of the power module should not be viewed as limiting. In an exemplary embodiment, power module may have a single AC input of 110 V/60 Hz up to 500 W. In an alternative embodiment, the input may be a single direct current (DC) input of 48 VDC up to 90 W. The module may be capable of outputting 5, 12, 24 or 48V DC current up to 150 W. Power module may also include an alarm input. Also, power module may be designed to operate within a temperature range of −40° C. and 65° C. Alternatively, the one or more power modules may service internally housed storage devices, such as batteries, PoE and so on, to maintain proper powered conditions. As such, the system 101 may primarily run on said power storage devices, or utilize these for primary or backup in case of power outage loss from the AC input or other electrical surges/brownouts occurring in the feeder electrical grid. Lastly, the system 101 may be powered entirely independently, such as running on self-contained DC power storage devices, solar power, and so on.

With respect to power, regardless of the source, the system 101 and/or node 110, 140 electrification may be further monitored/controlled by the one or more computational components 100 and/or otherwise may be configured to provide on-demand power increase and/or decrease depending on the power consumption incurred by the needed spool up of computational capacity. As such, the distributed nature of the computational capabilities over a decentralized architecture provides both a scalability method and a survivability method for the overall system 101 to receive additional computation boards to aid in meeting system demands, to create a redundancy in computational components to avoid fault critical failures, to allow for additional integration(s) of other hardware possibly due to improvements in computational hardware, and/or to assist in heating management for the system 101 as it seeks to maintain nominal operating conditions.

Example Training and Evaluation of Threat Detection Models

Figure 4:
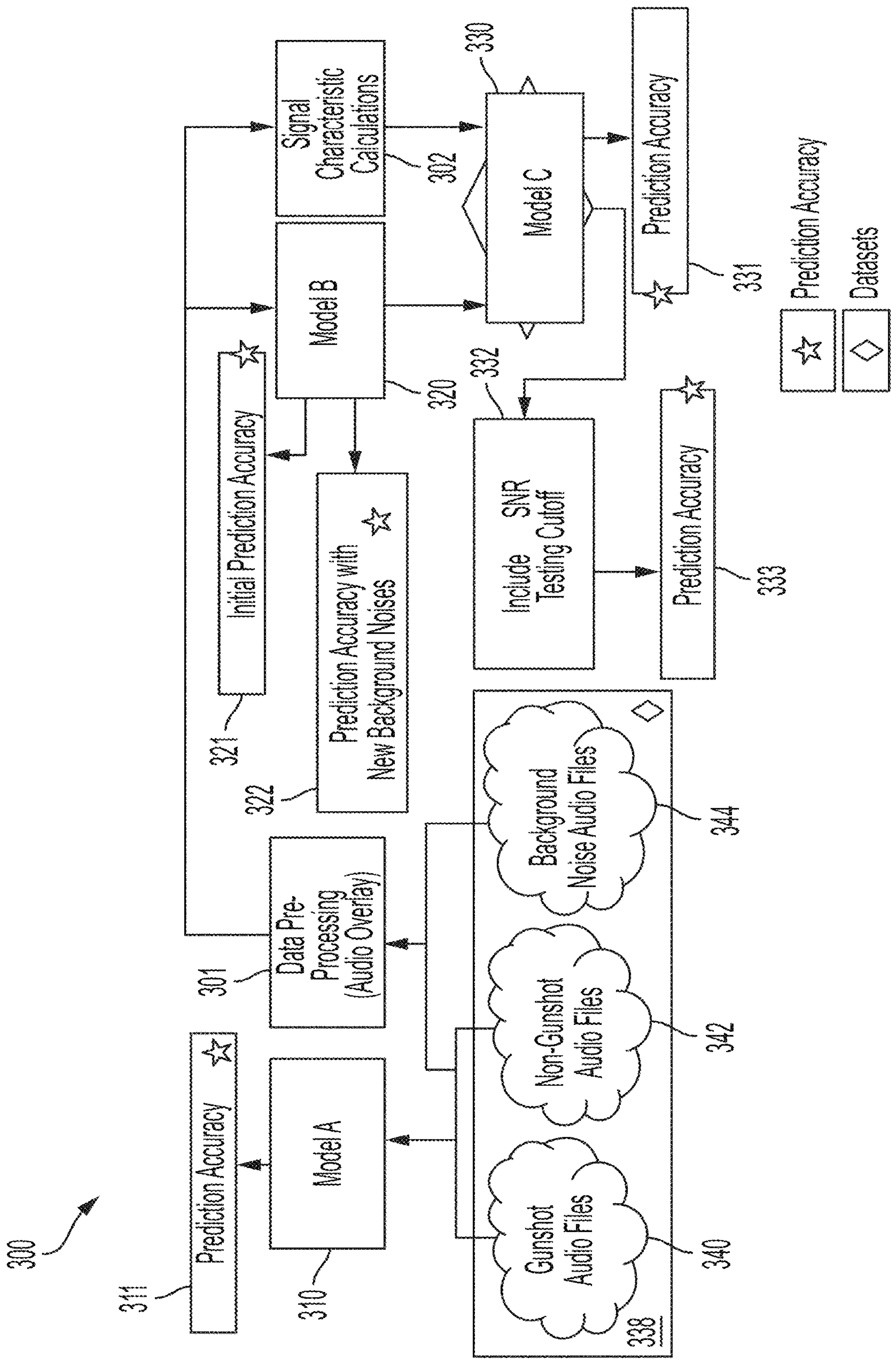
FIG. 4 is an exemplary diagrammatic representation of artificial intelligence processes performed by an intelligent computing node having dataset models with firearm discharge in sterile and noisy-background environments in accordance with the present disclosure.

FIG. 4 is a flowchart describing an example of a method 300 of preparing and using artificial intelligence models, including Model A 310, model B 320, Model C 330 to perform threat detection. Method 300 may be implemented using the systems of this disclosure, including the systems illustrated in FIGS. 1-3 and 7. For example, method 300 may be implemented using the sensor node(s) 110, transmitting/receiving node(s) 140, and/or cloud computing system 190 of FIGS. 1-3 and/or the memory 718 and processor 716 of FIG. 7. The use of method 300 helps to facilitate threat or other stimulus detection with a high confidence.

In method 300, training data 338 is used to build and test the models 310, 320, 330. The training data (or datasets) 338 includes threat-positive audio data 340, threat-negative audio data 342, and background noise audio data 344. The threat-positive audio data 340 generally includes sensor readings (e.g., audio or other data type recordings) of the threat or stimulus to be measured. For the example scenario in which the threat is a firearm discharge, the threat-positive audio data 340 includes sensor recordings of gunshots. The negative audio data 342 generally includes recordings of sounds known to not correspond to a threat or other stimulus to be detected. For the example scenario in which the threat is a firearm discharge, the negative audio data 342 may include recordings of other loud noises, such as a car backfiring, an object hitting a surface, or the like. The background noise audio data 344 generally includes sensor recordings of ambient or background noises or other sensor data common to the space in which the threat is to be detected. For instance, the background noise audio data 344 may include sounds or other sensor data from the space monitored by the threat detection system when the threat is known not to exist. As explained further below, in some cases, the background noise audio data 344 may be updated over time or at intervals by obtaining data specific to the space in which the threat is to be detected. Other training data 338 may be similarly updated. Use of updated training data 338 may improve threat detection. The training data 338 may be stored in any memory of the systems of this disclosure (e.g., any memory of a component shown in FIG. 1-3 or 7). Instructions for implementing the various models are also stored in one or more of these memories.

Model A 310 may be any appropriate artificial intelligence or machine learning model. In some cases, Model A 310 uses a convolutional neural network (CNN) to detect a threat or other stimulus (e.g., stimulus 170 of FIGS. 1-3 and 7) without using ambient or background noise data 344. Similarly, Model B 320 may be any appropriate artificial intelligence or machine learning model. In some cases, Model B 320 is a CNN that is trained using ambient or background noise data 344. Model C 330 may also be any appropriate artificial intelligence or machine learning model. For example, Model C 330 may use either or both of a CNN or support vector machine (SVM) to detect a threat or other stimulus. As described further below with respect to example implementations of the method 300, a signal characteristic, such as a signal-to-noise ratio (SNR) may be used to further improve detection reliability. In some cases, additional models are used. For example, a spiking neural network (SNN) may be trained similarly to model A 310 using threat-positive audio data 340 and threat-negative audio data 342 and used as a supplemental tool for further improving threat detection.

In an example implementation, Model A 310 is trained to detect an existence of a threat in arbitrary sensor (e.g., audio) data obtained from a monitored space (e.g., detection zone 150) using the threat-positive audio data 340 and the threat-negative audio data 342. For example, threat-positive audio data 340 may be provided to Model A 310 along with an indication that the data 340 is positive training data. Threat-negative audio data 342 is provided to Model A 310 along with an indication that the data 342 is negative training data. A portion of the training data 338 may then be used to evaluate Model A 310 by using the Model A 310 to predict whether a threat is detected in the portion of the data. A prediction accuracy 311 is determined in this manner for Model A 310.

Data processing 301 is performed to generate overlayed training data in which the threat-positive audio data 340 and threat-negative audio data 342 have been combined or overlayed upon the background noise audio data 344. For example, the background noise audio data 344 may be overlayed with threat-positive audio data 340 to generate overlayed threat-positive audio data, and the background noise audio data 344 may be overlayed with threat-negative audio data 342 to generate overlayed threat-negative audio data. The overlayed threat-positive audio data and threat-negative audio data are then used to train Model B 320 (e.g., in the same or similar manner to the training of Model A 310, described above). An initial prediction accuracy 321 can be determined for Model B 320 using a portion of the data 340, 342, 344 and/or any of the overlayed data as test data.

In some cases, the background noise audio data 344 may be updated with sounds specific to the location in which threat detection is being performed. For example, an audio sensor in the space being monitored may record real-world background noise data in the space monitored by the threat detection system (e.g., using a sensor node 110 of FIG. 1). Real-world background noise data may comprise a large range of acoustic properties that vary randomly and rapidly between and within environments. The resulting real-world background noise data may be overlayed with the threat-positive audio data 340 to generate space-specific threat-positive audio data, while the real-world background noise data is overlayed with the threat-negative audio data 342 to generate space-specific threat-negative audio data. This space-specific data is then used to retrain Model B 320. An updated prediction accuracy 322 can then be determined for the retrained Model B 320 using a portion of the data 340, 342, 344 and/or any of the overlayed data or space-specific data as test data. In some cases, the updated prediction accuracy 322 is improved over the initial prediction accuracy 321, thereby improving threat detection and threat detection technology.

Signal characteristic calculations 302 may be performed to provide further approaches and improvements to threat detection. The signal characteristic calculations 302 may include calculation of a signal-to-noise ratio, a signal power, a frequency-scaled power, and/or the like. For example, a signal-to-noise ratio characteristic(s) (or other signal characteristic(s)) may be determined for the overlayed threat-positive audio data and overlayed threat-negative audio data.

Figure 5:
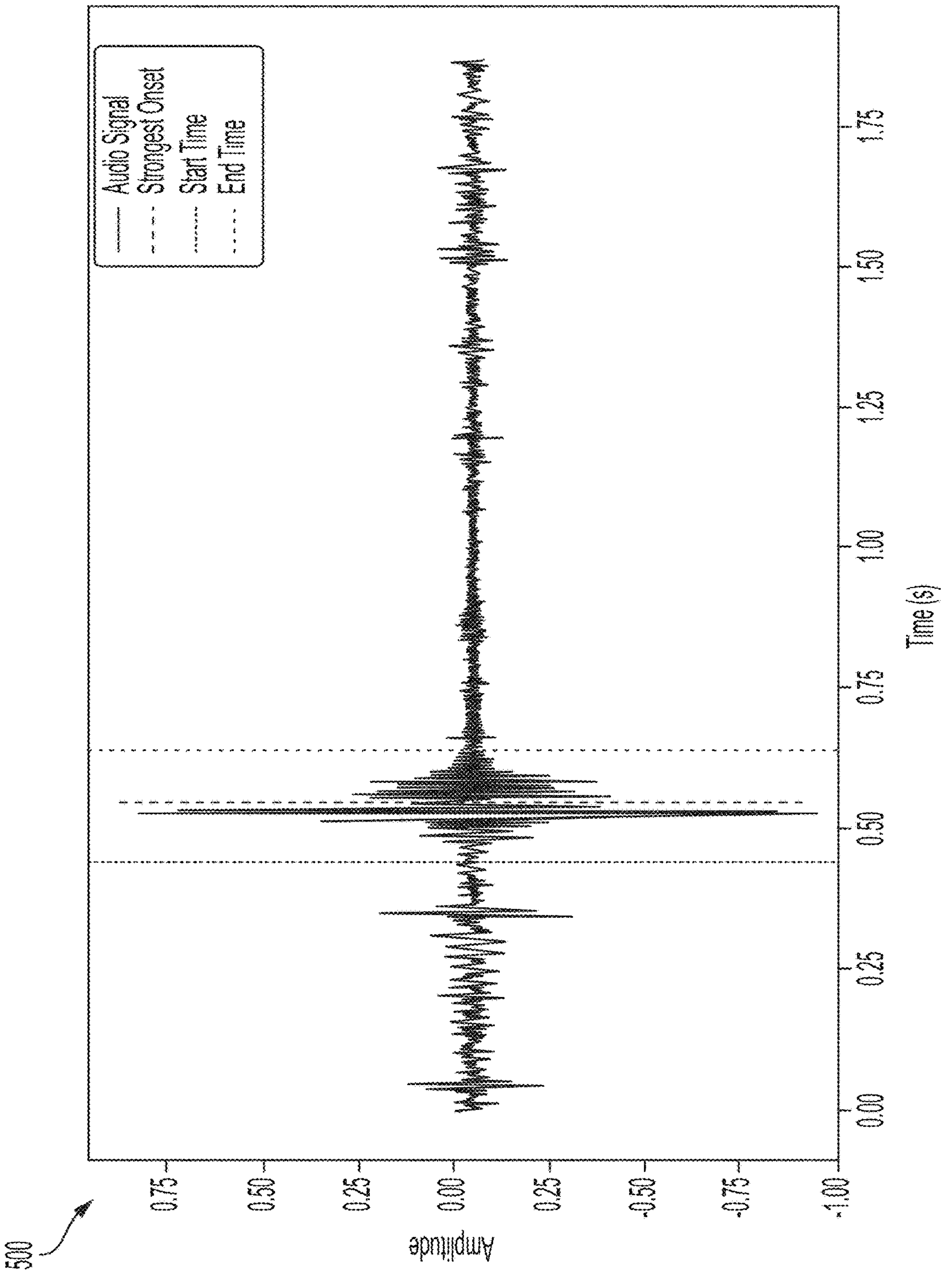
FIG. 5 is an exemplary diagrammatic representation of a firearm discharge detection region in a noise strength to signal strength plot in accordance with the present disclosure.

FIG. 5 shows an example of audio data 500 in which a gunshot is overlayed with background noise. A signal-to-noise ratio may be determined based on the ratio of the peak of the audio signal and a value corresponding to the background noise level. For instance, the signal-to-noise ratio may be determined as ten times the logarithm of the signal power to the noise power. Other approaches may be used to calculate signal-to-noise ratio and other signal characteristics, as appropriate.

Returning to FIG. 4, Model C 330 is then trained using the signal-to-noise ratio characteristic(s) (and/or other signal characteristic(s)). For instance, Model C 330 may be trained to detect the probability of the existence of a threat in sensor data using the overlayed threat-positive audio data, the overlayed threat-negative audio data, and signal-to-noise ratio characteristic(s). A prediction accuracy 331 may be determined for Model C 330 using available data as test data.

In some cases, a signal-to-noise ratio cutoff may be used to further improve threat detection accuracy. For example, sensor data may be filtered to remove audio data or detected peaks/events below a given signal-to-noise threshold. This filtered data may be used to train an alternative or adjusted version of Model C 330 (or another model). A prediction accuracy 333 for the model employing the signal-to-noise cutoff may be determined in a similar or the same manner to that described above for the other models. The signal-to-noise ratio cutoff or other such thresholds/filtering parameters may settable and reconfigurable to adjust threat detection (e.g., to make the system more or less sensitive).

In some cases, the various prediction accuracies 311, 321, 322, 331, 333 may be compared to select one or more of the models for performing threat detection. Once one or more of the models are selected, sensor data is received and used to detect and respond to threats, as described elsewhere in this disclosure. For example, sensor data may be received from one or more sensors (e.g., sensor node(s) 110 of FIGS. 1-3) positioned in or around a space monitored by the threat detection system. The received sensor data may then be provided to the one or more selected models to determine a probability or a confidence score that a threat is detected in the space. For example, a confidence score may be calculated using Model A 310 and Model C 330, and one or both of these scores may be used to determine whether a threat is detected. If a threat is detected the existence of the threat is communicated to a recipient device, such as an alarm system, a mobile communication device, or an access control system, based on one or both of the first and second confidence scores. Examples of recipient devices are described in greater detail below with respect to the example of FIG. 7.

Example Threat Detection Method

Figure 6:
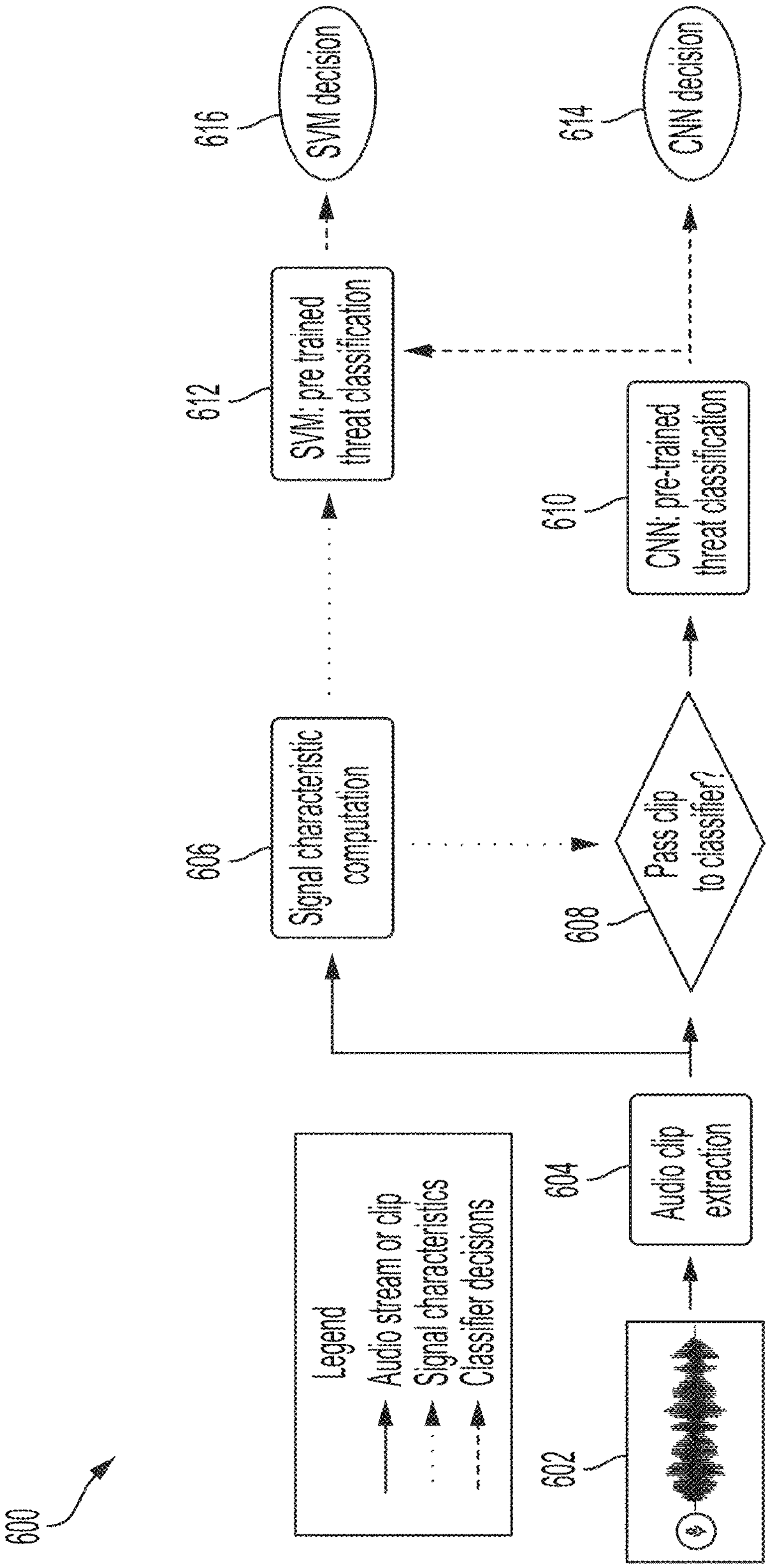
FIG. 6 is an exemplary diagrammatic representation of a process for firearm discharge detection in accordance with the present disclosure.

FIG. 6 is a flowchart of an example method 600 of detecting a threat using a threat detection system of this disclosure (see, e.g., FIGS. 1-3 and 7). Method 600 may be performed using the systems of this disclosure, including the systems illustrated in FIGS. 1-3 and 7 (e.g., by the processor 716 of FIG. 7). Method 600 uses models 610 and 612 for threat detection. Models 610 and 612 may be the same as or similar to models 310, 320, 330 of FIG. 4, described above. During the method 600, a stream of sensor data stream 602 (e.g., audio data) is received from one or more sensors positioned in or around a space monitored by the threat detection system (e.g., from sensor node(s) 110 in detection zone 150). At step 604, a portion of the data stream is extracted. For example, a sample or clip of the sensor data may be extracted. The two-second audio sample shown in FIG. 5 is an example of an extracted audio data clip. During method 300, multiple such data clips are extracted and evaluated as the data stream 602 is received, such that real-time or near real-time threat detection can be performed. The data clips may be partially overlapping in time.

At step 606, a signal characteristic is determined for the extracted portion of the data stream 602. The signal characteristic may include one or more of a signal-to-noise ratio, a power, and a frequency-scaled power. At step 608, a decision is made regarding whether to pass the extracted data to one of the threat detection models 610, 612. For example, the system may determine whether the extracted data clip is compatible with a first machine learning model 610. The extracted data clip is compatible with a first machine learning model 610 if the signal characteristic is greater than a threshold value. For instance, if the signal-to-noise ratio of a peak in the clip is greater than a threshold value, the clip may be provided to the first model 610. Otherwise if the threshold is not reached, the system determines that no threat is detected in the data clip, and a subsequent portion of the data stream 602 may be extracted by returning to step 604.

When criteria are met for passing a data clip to the first model 610 (e.g., a CNN model-see FIG. 4), the first model 610 determines whether a threat is detected in the data clip (e.g., by classifying the clip as a true positive, false positive, true negative, etc.). The decision 614 output by the first model 610 includes this information. This decision 614 may be a confidence score or probability of a detected threat and may be used alone or in combination with the output decision 616 of the second model 612, as described below. The decision 614 is provided to the second model (e.g., a SVM model—see FIG. 4) along with the data clip and the signal characteristic determined at step 606. The second model 612 determines another decision 616 indicative of whether a threat is detected. For example, the decision 616 may be a confidence score or probability that a threat exists in the space monitored by the threat detection system.

The overall decision regarding whether the existence of the threat is detected may be made based on decisions 614 and 616 from one or both of the models 610 and 612. For example, in some cases, if at least one confidence score decisions 614 and 616 is greater than a threshold value, the existence of a threat may be detected. In other cases, a threat may be detected if both confidence scores are greater than a threshold value (e.g., or if each score is greater than a corresponding threshold value). In other cases, a threat may be detected if an average or a weighted average confidence score is greater than a threshold value. When a threat is detected, the existence of the threat is communicated to a recipient device, such as an alarm system, a mobile communication device, or an access control system, as described in greater detail below with respect to FIG. 7.

Example Operations of a Threat Detection System

Figure 7:
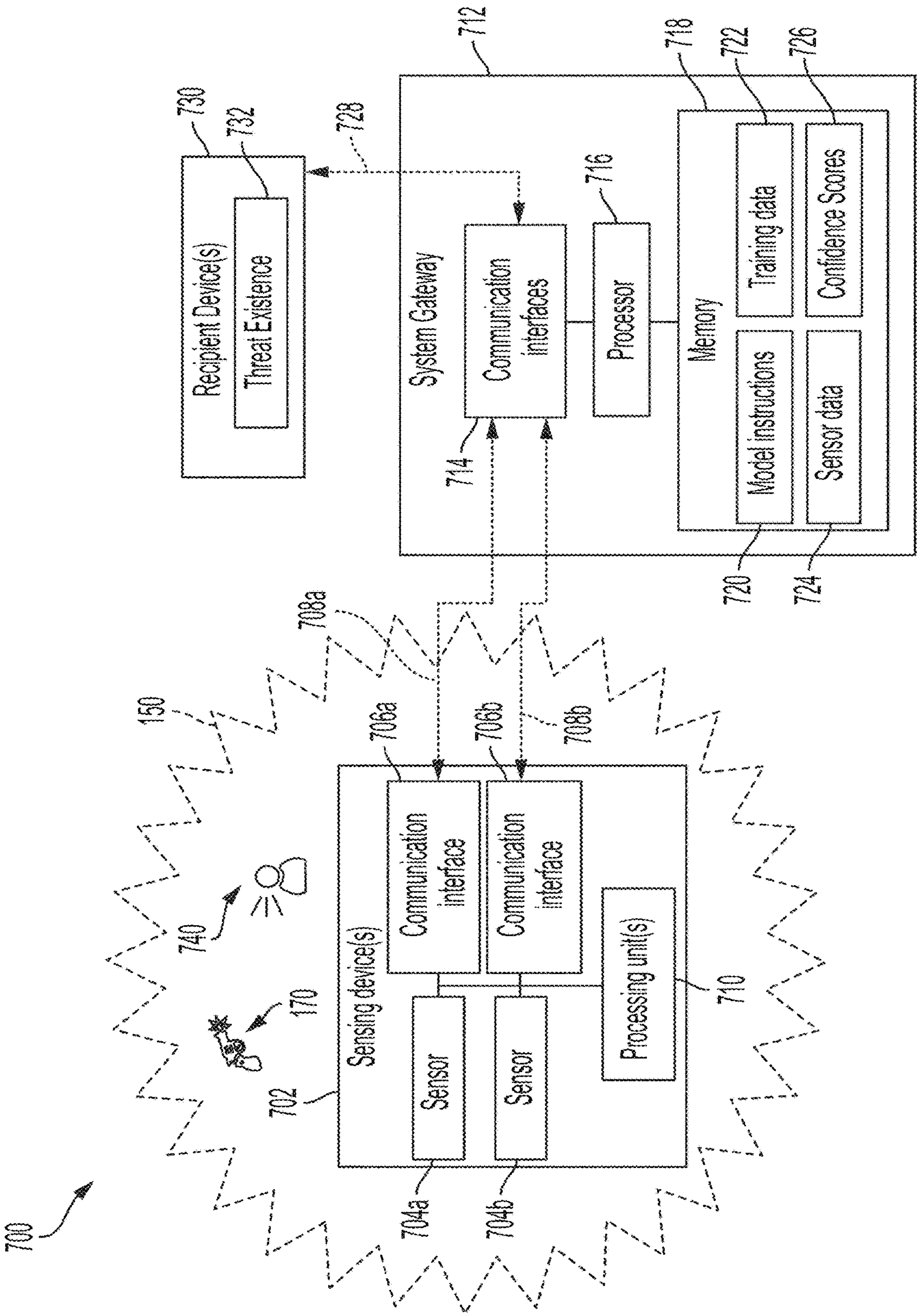
FIG. 7 is an exemplary diagrammatic representation of a threat sensing and response system in accordance with the present disclosure.

FIG. 7 illustrates an exemplary threat sensing and response system 700 of this disclosure. The example threat response system 700 includes at least one threat sensing device 702, such as gunshot detection sensors, and a system gateway 712. The threat sensing device 702 may detect and digitize gunshot sound and related image data (and/or other sensor data) into waveform/digital data, then transmit this sensory dataflow to the system gateway 712. The computational components and/or processors (e.g., interface 714, processor 716, and memory 718) of the gateway 712, wherever these are located given the type of centralized and/or decentralize architecture that is present, process the dataflow and perform tasks for firearm discharge detection, firearm discharge triangulation, corroboration of firearm discharge or firearm detection, assailant tracking, reduction of false negative activations, and/or initiation of response protocols (e.g., to automatically send notification(s) and/or threat information to other system components, such as collaborative nodes/assets, and/or to a human-in-the-loop).

The sensing device(s) 702 generally include one or more sensors 704*a,b* capable of sensing properties of a detection zone 150 (see FIGS. 1-3) associated with the existence of a threat. For example, the sensors 704*a,b* may include at least one of a motion sensor, a temperature sensor, an image sensor, a light sensor, a sound sensor, a pressure sensor, a gas sensor, a chemical sensor, a radar device or array, a Wi-Fi signal-based sensor, and a biologic sensor. The sensing device(s) 702 correspond to the sensing node(s) 110 of FIGS. 1-3 and may also include functionality of the transmitting/receiving node(s) 140 of these figures (e.g., for transmitting sensor data to the system gateway 712). While shown as separate components, in some cases, the sensing device(s) 702 and they system gateway 712 are integrated into a single device capable of collecting sensor data 724 and evaluating the data 724 to detect the existence of a threat.

The sensing device 702 is not limited to any number or type of sensors 704*a,b*. Furthermore, the threat response system 700 is not limited to any number of computation components utilized in the ongoing awareness and machine/robotic decision-making workflows running within the detection zone 150 or distributed beyond the detection zone 150, such as, but not limited to, running in the cloud, off-site, onboard aerial/ground assets, underground, and so on. For example, in some embodiments, a first sensor 704*a* may include at least one of a motion sensor, a temperature sensor, an image sensor, a light sensor, a sound sensor, a pressure sensor, a gas sensor, a chemical sensor, a radar device or array, a Wi-Fi signal-based sensor, and a biologic sensor. A second sensor 704*b* may include at least one of a motion sensor, a temperature sensor, an image sensor, a light sensor, a sound sensor, a pressure sensor, a gas sensor, a chemical sensor, a radar device or array, a Wi-Fi signal-based sensor, and a biologic sensor. In some embodiments, the first sensor type is different than the second sensor type. In other embodiments, the first sensor type is the same as the second sensor type.

In some cases, each sensor 704*a,b* is associated with (e.g., is coupled to or includes) a corresponding communication interface 706*a,b* for transmitting sensor data from the sensor 704*a,b*, as described in greater detail below. In some cases, the sensing device 702 includes one or more processing units 710, such as one or more controllers or microcontrollers with associated processing, memory, and communication components. As an example, the processing units 710 may include one or more neural processing units (NPUs) or other processor(s) for locally executing machine learning or other models/algorithms to detect the existence of a threat and/or detect initial evidence of a threat for further analysis by the system gateway 712. The processing units 710 may include a CPU or other processor(s) to control operations of the sensing device 702 and/or perform computational tasks using sensor data 724 obtained from sensors 704*a,b*. In some embodiments, the processing units 710 are replaced with all or a portion of the system gateway 712, such that all or a portion of the functions of the system gateway are performed locally by the sensing device 702. In such embodiments, "transmission" of sensor data 724 to the system gateway 712 refers to the more local on-device routing of data between sensors 704*a,b* and processing resources used for data analysis.

The system gateway 712 generally includes computational components for analyzing sensor data to detect and respond to a threat. The example system gateway 712 includes one or more communication interfaces 714 (e.g., to receive sensor data 724), a processor 716 (e.g., to analyze sensor data 724), and a memory 718 (e.g., to store sensor data 724, analysis instructions/code, and/or analysis results). The communication interface(s) 714 enables wired and/or wireless communication between components of the system 700. For example, the communication interface(s) 714 communicates data between the system gateway 712 and the sensor device(s) 702 and recipient device(s) 730. The communication interface(s) 714 may include one or more serial ports (e.g., USB ports or the like) and/or parallel ports (e.g., any type of multi-pin port) for facilitating this communication. As another example, the communication interface(s) 714 may include a WIFI interface, a local area network (LAN) interface, a wide area network (WAN) interface, a modem, a switch, or a router. The processor 716 is configured to send and receive data using the communication interface(s) 714. The communication interface(s) 714 may be configured to use any suitable type of communication protocol.

The processor 716 processes and/or executes code and/or other instructions (e.g., model instructions 720). The processor 716 may include one or more processors, which may be specialized processors configured to execute instruction-set-architecture (ISA) instructions, machine instructions, machine dependent instructions, microcode, firmware instructions, state-setting data, or either source code or object code written in any combination of one or more programming languages, including an object oriented programming language such as PHP, Python, Ruby, Scala, C++ or the like, and conventional procedural programming languages, such as the "C" programming language or similar programming languages. The instructions may include one or more code segments (e.g., including model instructions 720). The code segment or machine-executable instructions may represent a procedure, a function, a subprogram, a program, a routine, a subroutine, a module, a software package, a class, or any combination of instructions, data structures, or program statements. The code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The instructions may execute entirely on the system gateway 712, partly on the system gateway 712, as a stand-alone software package, partly on the system gateway 712 and partly on a remote computer or entirely on the remote computer or server. The remote computer may be connected to the system gateway 712 via communication interface(s) 714 through any type of network, including a hard-wired connection, a local area network (LAN), a wide area network (WAN), or the connection may be made to an external computer (for example, through the Internet using an Internet Service Provider). In various embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure. The processor 716 may additionally include of any one or more central processing unit (CPU), graphics processing unit (GPU), accelerated processing unit (APU), arithmetic-logic unit (ALU), tensor processing unit (TPU), neural processing unit (NPU), quantum computing-based processing unit, in any combinations thereof, regardless of core/qubits count and/or utilized chip/chipset type, The processor 716 configured to process the sensor data 724 collected based on stimulus/stimuli present in the detection zone 150. The processor 716 may determine the existence of threat(s) by processing a probability to give a confidence score based on the sensor data 724 that corresponds to a predetermined known threat, such as a gunshot (or another stimulus or event of interest) or other corroborating data. The processor 716 may then communicate the existence of the threat to at least one, or a plurality of, recipient device(s) 730 via communication interface(s) 714. For example, a threat existence 732 may be communicated to a recipient device 730 if a confidence score is greater than or equal to a threshold value.

The memory 718 stores any data, instructions, logic, rules, and/or code for executing the functions of system gateway 712. The memory 718 may store model instructions 720, which includes any code for implementing the various models of this disclosure, including models 310, 320, and 330 of FIG. 3 and models 610 and 612 of FIG. 6. The memory 718 may store training data 722 (e.g., data 338 of FIG. 4), sensor data 724 (e.g., measured and communicated by sensors 704*a,b*), and confidence scores calculated using the sensor data 724. The memory 718 includes one or more disks, tape drives, or solid-state drives, and may be used as an over-flow data storage device, to store programs when such programs are selected for execution, and to store instructions and data that are read during program execution. The memory 718 may be volatile or non-volatile and may comprise read-only memory (ROM), random-access memory (RAM), ternary content-addressable memory (TCAM), dynamic random-access memory (DRAM), and/or static random-access memory (SRAM).

All or a portion of the threats sensing and response system 700 may be installed or located inside a detection zone 150 (see also FIGS. 1-3). The detection zone 150 may be a detection area located indoors, outdoors, and/or on premises. The detection zone 150 is generally determined by the sensing range of the sensors 704*a,b*. For indoor installations, components of the threat response system 700 may be installed, mounted or located in a building. The building may be any type of building or structure, including, for example, a school, a hospital, a residential house, an apartment, a dormitory, a nursing home, a retirement home, a medical facility, an office building, warehouse, a retail store, a church, a government building, a parking garage, a hotel, a casino, an airport, a stadium, or an area. For outdoor installations, components of the threat response system 700 may be installed, mounted or located in an outside environment, for example, on a campus, a public environment, a neighborhood, a city landscape, a thoroughfare, an outdoor recreational area, a vehicle, unmanned airborne vehicle, or a playground. For on-premises installations, components of the threat response system 700 may be installed, mounted or located on property that includes both structure(s)/building(s)/vegetation, and land that makes up a parcel of property.

The sensing device 702 may be an edge device. Likewise, the sensors 704*a,b* may be edge devices. The edge device sensors may measure conditions or events, trigger actions, and/or route data to the system gateway 712. The edge device sensors may be intelligent edge devices. A benefit of the edge devices and edge computing infrastructure is that they create a local edge layer where functionality for automation and response can be conducted near the source, reducing latency and bandwidth constraints, which is important for threat detection systems.

The system gateway 712 may be installed on a structure, including a utility pole, such as described above. The processor 716 of the system gateway may communicate the existence of the threat to the recipient device 730 via a secure protocol 728, such as a hard-wired connection. However, the communication is not limited to a wired network, and may include a wireless network that can be secured to prevent unauthorized access or attacks, for instance, with an advanced authentication process such as enterprise WPA2 with 802.1X.

The recipient device 730 may be any entity or device that is the intended destination for a message, data, or information. For example, the recipient device 730 may be an alarm system. The alarm system may be a system, device, or mechanism that, when activated, transmits a signal that is intended to summon a response, such as to police, emergency responder, a private alarm monitoring company or some other number, emits an audible or visible signal that can be heard or seen by persons outside the monitored indoor environment, outdoor environment or premises (collectively, monitored environments) or transmits a signal beyond the monitored environments in some other fashion, to report a crime in-progress or other crisis situation requiring a response.

The recipient device 730 may be a mobile communication device. The mobile communication device may be any portable wireless telecommunications equipment that can transmit and/or receive voice, video, or computer data. Such devices include, but are not limited to cellular or mobile telephones, pagers, two-way radios, wireless modems, and portable Internet appliances.

The recipient device 730 may be an access control system. The access control system may be an electronic system that allows authorized personnel to enter controlled, restricted, or secure spaces within the monitored environments by presenting an access credential to a credential reader.

Example Operation with Dual Communication Protocol Communication

In some cases, the threat sensing and response system 700 is operated using a different communication protocol 708*a,b* for each of at least two sensors 704*a,b* used for threat detection. In such cases, the sensing device 702 includes at least a first sensor 704*a* configured to transmit first sensor data (raw or processed) via a first communication protocol 708*a* (e.g., via its corresponding first communication interface 706*a*) and a second sensor 704*b* configured to transmit second sensor data (raw or processed) via a second communication protocol 708*b* (e.g., via its corresponding second communication interface 706*b*) that is different than the first communication protocol 708*a*. In some embodiments, the first sensor 704*a* may include at least one of a motion sensor, a temperature sensor, an image sensor, a light sensor, a sound sensor, a pressure sensor, a gas sensor, a chemical sensor, a radar device or array, a Wi-Fi signal-based sensor, and a biologic sensor. The second sensor 704*b* may include at least one of a motion sensor, a temperature sensor, an image sensor, a light sensor, a sound sensor, a pressure sensor, a gas sensor, a chemical sensor, a radar device or array, a Wi-Fi signal-based sensor, and a biologic sensor. In some embodiments, the first sensor type is different than the second sensor type. In other embodiments, the first sensor type is the same as the second sensor type.

The system gateway's processor 716 receives the transmitted first and second sensor data 724. The processor 716 determines an existence of a threat by calculating a probability to give a confidence score 726 based on the first and second sensor data 724 that corresponds to a predetermined known threat, such as a gunshot (not limited thereto). The processor 716 may then communicate the existence of the threat to at least one recipient device 730 with the confidence score 726 that may be above or equal to a threshold value. In some cases, before the sensor data 724 is transmitted to the system gateway 712, the processing unit 710 analyzes the sensor data 724 to detect initial evidence of the existence of the threat. For example, one or more machine learning models may be trained to detect such evidence using local processing resources, such as an NPU or other processing unit(s) of the processing unit(s) 710. The sensor data associated for which evidence of a threat was detected may then be transmitted to the system gateway 712 for further analysis and confirmation of the existence of the threat.

The first and second communication protocols 708*a,b* may include standardized communication protocols that have been codified as a standard, such as, for example, any one of Bluetooth, Zigbee, 6LoWPAN, Wi-Fi, Cellular, Private LTE, 3G/4G/5G/6G mobile wireless, Modbus, PROFINET, and EtherCAT. The first sensor 704*a* may be configured to form a set of data packets using the sensor data 724 collected by the first sensor 704*a*. The set of data packets may include a header that describes a first detection event. The second sensor 704*b* may be configured to form a second set of data packets using the second sensor data 724 collected by the second sensor 704*b*. The second set of data packets may include a header that describes a second detection event.

Figure 8:
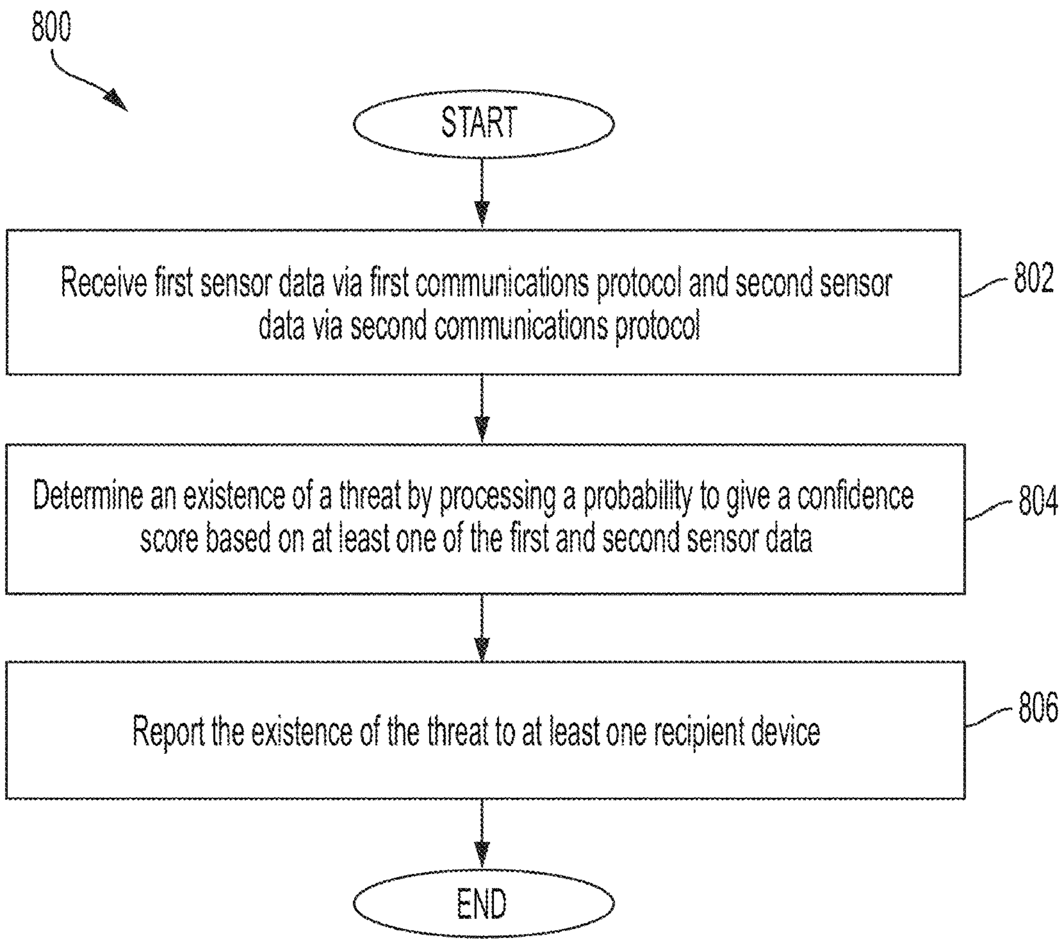
FIG. 8 is an exemplary embodiment of a process for detecting and communicating a threat in accordance with embodiments of the present disclosure.

FIG. 8 is a flowchart depicting an exemplary process 800 for detecting and/or communicating a threat in accordance with the present disclosure. For example, the process 800 may include a series of computing operations that may be performed by one or more computing devices, such as one or more processors 716 of the system gateway 712 as described above. The threat may be any type, including, for example, an existence of a weapon or a gunshot.

Each operation in the flowchart of FIG. 8 may represent a module, segment, or portion of instructions, which include one or more executable instructions for implementing the specified logical function(s). In some alternative implementations, the functions noted in the block may occur in a different order than is shown in FIG. 8. For example, two operations shown in succession may, in fact, be executed substantially concurrently, or the operations may sometimes be executed in the reverse order, depending upon the functionality involved. It will also be noted that each operation of the flowchart can be implemented by special purpose hardware-based systems that perform the specified functions or acts or carry out combinations of special purpose hardware and computer instructions. While the following description uses the examples of audio and image/video sensors, these are merely illustrative, and any sensor data can be processed in a similar manner and are not intended to be limiting.

The process 800 involves step 802 of receiving, via the system gateway 712, first sensor data via a first communication protocol 708*a* and second sensor data via a second communication protocol 708*b* that is different than the first communication protocol 708*b*. As described above, the system gateway 712 may receive various communications from a number of sensors 704*a,b* distributed throughout a detection zone 150. Each of the sensors 704*a,b* may be configured to communicate using a protocol 708*a,b* that is appropriate for the sensor data being collected.

For example, the first sensor data may include a sound waveform collected by an audio sensor and a set of parameters that correspond to the sound waveform (e.g., period, amplitude, frequency, phase, etc.). The first sensor data may also include a set of attributes that have been pre-processed by the audio sensor. For example, the set of attributes may include peaks detected, intensity (decibel scale), and peak frequency. Using the sound waveform and the set of attributes, the first sensor 704*a* may be configured to form a set of data packets. The set of data packets may include a header that describes a first detection event such as a peak detection with a frequency corresponding to the peak (not limited thereto).

The system gateway 712 may receive second sensor data such as from an image or video sensor (not limited thereto). The second sensor data may include the image/video along with a set of video parameters such as image size, frame rate, zoom, luminance, depth, time stamp, duration, direction of movement, or the like. In some embodiments, the second sensor 704*b* may initiate image or video capture in response to detecting motion (e.g., object detection/infrared detection, etc.). The second sensor 704*b* may be configured to form a second set of data packets using the second sensor data collected by the second sensor 704*b*. The second set of data packets may include a header that describes a second detection event such as a start time stamp, duration, and an identifier of image or video (not limited thereto).

The process 800 further involves a step 804 of determining an existence of a threat, via the system gateway 712, by processing a probability to give a confidence score 726 based on at least one of the first and second sensor data. The processor 716 may be configured to analyze a sound waveform from the first sensor data, correlate the sound waveform to one of a plurality of audio signatures stored in a database, and assign the confidence score 726 based on the audio correlation. In some embodiments, the processor 716 may correlate the sound waveform to one of a plurality of audio signatures using a pre-trained classifier, or using a comparison between a preset peak intensity and preset frequency associated with the peak of each audio signature and the peak intensity and frequency associated with the peak of the sound waveform. In some cases, the frequency response of sound waveform may be correlated to the frequency responses of unfiltered acoustic sounds for known threats to determine a confidence score 726. It is understood that the processor 716 may use other known processes to perform correlation, such as time duration or sound waveform reflections.

The processor 716 may be further configured to assign a confidence score 726 that indicates a likelihood that the sound waveform is correlated to the audio signature. For example, the confidence score 726 may be "80%" that the audio waveform correlates to an audio signature of a gunshot, or any percentage from 0-100%. If the confidence score 726 is at or above a predetermined confidence threshold, then then the processor may determine that there is a threat, such as a gunshot or a spoken vocal phrase (as described further below). Alternatively, the processor 716 may be configured to assign multiple confidence scores 726 to each audio signature in the database, such as 0.6 gunshot, 0.3 explosion, 0.1 book contacting a floor (e.g., with values normalized to "1") with each confidence score 726 indicating the likelihood that the sound waveform is accurately correlated to the respective audio signature.

In some embodiments, the determination of the existence of a threat may include analyzing image data from the second sensor data, correlating the image data to one of a plurality of pre-defined images stored in a database, and assigning the confidence score 726 based on the image correlation. In some cases, the second sensor data may be provided for human review. The processor 716 of the system gateway 712 may be configured to determine whether the image data includes a weapon based on the amount of similarity between the image data and features of template objects that represent a weapon or human activity, such as people running or doors closing. For example, the processor 716 may be configured to determine whether the image data includes a weapon using a comparison of a heat signature of the image data to a threshold temperature. To perform the heat signature comparison, the processor 716 may be configured to extract thermal information that corresponds to objects within the image. The processor 716 may then compare the thermal information corresponding to the object with a set of predetermined thermal information corresponding to threats such as muzzle temperatures, explosions, fires, or detonations. The processor 716 may be configured to assign a confidence score 726 that indicates a likelihood that the image data is correlated to one of a plurality of pre-defined images. For example, the confidence score 726 may be "80%" that the image data correlates to pre-defined image of a handgun, or any percentage from 0-100%. If the confidence score 726 is at or above a predetermined level, such as 80%, then then the processor 716 may determine that there is a threat, such as a weapon. Alternatively, the processor may be configured to assign multiple confidence scores 726 to each predefined image in the database, such as 0.6 weapon, 0.3 smoke, and 0.1 umbrella (e.g., values normalized to "1") with each confidence score 726 indicating the likelihood that the image data is accurately correlated to the respective predefined image.

As another example, the processor 716 may be configured to perform object recognition for candidate objects in the image to determine if a threat is included in the image. The processor 716 may compare the recognized objects to a plurality of pre-defined images that correspond to various threats. For example, the pre-defined images may include any one of a gun (e.g., a gun barrel, a trigger assembly, etc.), a gun type, a weapon, ammunition, smoke, muzzle flash, body features, facial features, people running, clothing, discharge smoke, and dust particles. The processor 716 may be further configured to categorize the object into sub-types. For example, if the processor 716 determines that the object is a gun, then the processor 716 may further determine a gun type, such as at least one of the following: a handgun, a long gun, a rifle, a shotgun, a carbine, an assault rifle, a battle rifle, a sniper rifle, an automatic rifle, a machine gun, a submachine gun, or a personal defense weapon. The processor 716 may be configured to assign a confidence score 726 that indicates a likelihood that the recognized object is correlated to one of a plurality of pre-defined images, such as described above.

In some embodiments, using the above described process 800, the processor 716 may be configured to assign a confidence score 726 that indicates a likelihood of a threat based on sensor data received from more than one sensor. More specifically, the processor 716 may receive first sensor data from the first sensor 704*a* and second sensor data from the second sensor 704*b*. In this example, using the first sensor 704*a* as an audio sensor and the second sensor 704*b* as an image sensor, the processor 716 may correlate a sound waveform from the first sensor data to an audio signature (e.g., pre-defined noise) associated with the threat and assign a first confidence score 726 based on the correlation of the sound waveform to the audio signature. If the confidence score 726 is at or above a predetermined threshold indicating the potential of a threat, then the processor will analyze image data received from the second sensor data and correlate the image data to a pre-defined image associated with the threat. Alternatively, the processor 716 may be configured to analyze image data received from the second sensor data whether or not the first confidence score 726 is at or above a predetermined threshold. The processor 716 will then update the first confidence score 726 based on a correlation of the image data to the pre-defined image. While this embodiment is described with reference to an audio sensor and image/video sensor, it is not limited thereto. Any combination of sensors and any order of processing may be used.

The process 800 may further involve, at step 806, reporting the existence of the threat to at least one recipient device when the updated confidence score 726 is above or equal to a threshold value. As described above, the processor 716 may communicate the existence of the threat to any entity or device that is the intended destination for a message, data, or information, such as an alarm system or mobile device. As described above, the confidence score 726 may be assigned using the first sensor data, the second sensor data, or a combination thereof.

In some embodiments, the process 800 may involve requesting, via the system gateway 712, third sensor data and updating again the confidence score 726 ("second updated confidence score") based on the third sensor data. Similar to as described above, the processor 716 may be configured to request sensor data 724 from the various sensors 704*a,b* that are communicatively coupled to the system gateway 712. In response to the request, the system gateway 712 may receive third sensor data from a third sensor (the third sensor can be one of the first and second sensors 704*a,b* or a different sensor). The third sensor data may include data from at least any one of: a motion sensor, a temperature sensor, an image sensor, a light sensor, a sound sensor, a pressure sensor, a gas sensor, a chemical sensor, and a biologic sensor. As described above, the sensor data 724 may be compared using similarity computations, intensity/frequency correlation, object recognition, and the like. For physical detection sensors, such as pressure, gas, chemical, or biologic sensors, various thresholds such as pressure thresholds, concentrations (e.g., parts per million), or the like may be used.

The second updated confidence score may be determined using a process similar to the confidence score assignments described above. The processor 716 may be configured to notify the recipient device(s) 730 that the existence of the threat (e.g., a gunshot) is incorrect or a false alarm if the second updated confidence score does not exceed the threshold confidence score. By updating the confidence score 726 using third sensor data, the system gateway 712 reduces the number of false positive initial threat determinations. Similarly, the processor 716 may be configured to notify the recipient device(s) 730 of the existence of a threat, e.g., gunshot or weapon, if the second updated confidence score increases to a level that is above the threshold confidence score. This process may be performed iteratively from an initial detection until a security response is complete or the confidence score 726 is updated to a value below the threshold (e.g., a threat is no longer detected).

Example Operation Based on Detected Vocal Phrase

In some embodiments of the threat sensing and response system 700, the system 700 may be used to detect a threat based on the detection of a specific vocal phrase 740 associated with a threat being spoken in the detection zone 150. For example, persons occupying a space that includes the detection zone 150 may be trained to speak the vocal phrase 740 of "code red" or other predefined vocal phrase in the case of the existence or non-existence of a credible threat or other emergency. In such cases, at least one of the sensors 704,*a,b* is a sound sensor capable of detecting sound in the detection zone 150, such that human speech can be recorded. The resulting audio data is transmitted to the system gateway 712, which analyzes the audio data to determine whether a predefined vocal phrase associated with a threat or non-threat is detected (e.g., based on determination of one or more confidence scores 726, as described with respect to the examples above). Additional and/or other sensor data 724 may be used over time to corroborate the existence or non-existence of the threat and/or to update the confidence score 726 for the threat, as also described above.

Figure 9:
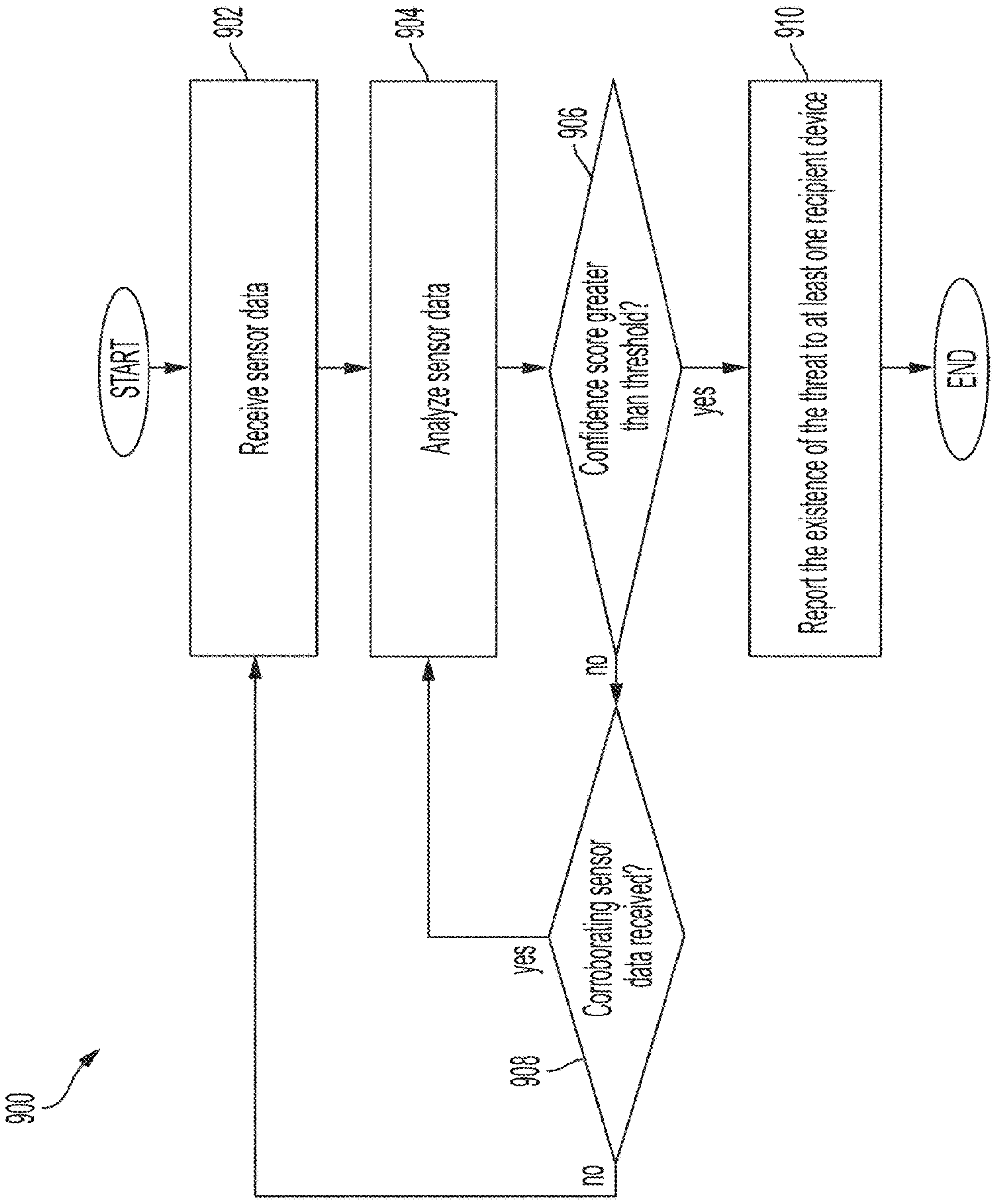
FIG. 9 is an exemplary embodiment of a process for detecting and communicating a threat based on a detected vocal phrase in accordance with embodiments of the present disclosure.

FIG. 9 illustrates an example process 900 of detecting a threat based on a detected vocal phrase 740. Process 900 may be performed by the processor 716 of FIG. 7. At step 902, the processor 716 receives sensor data 724 that includes sound data. At step 904, the processor 716 analyzes the sound data to detect a vocal phrase 740. For example, the vocal phrase 740 may be detected by determining a confidence score 726 for the threat based on an extent to which the detected vocal phrase is correlated to the pre-defined phrase. At step 906, the processor 716 determines whether the confidence score 726 is greater than a threshold value. If this is the case, the processor proceeds to step 910 and communicates the existence of the threat to the recipient device(s) 730.

If this is not the case, the processor proceeds to step 908 to determine if corroborating sensor data was provided. For example, the processor 716 may further analyze the sound data to detect one of more additional instances of the vocal phrase 740 being spoken in the space by the same or different individuals. If the vocal phrase 740 is spoken multiple times, the confidence score 726 may be increased. If the confidence score is spoken by multiple individuals, the confidence score 726 may be increased. As another example, other sensor data may be used to corroborate the existence of a threat (e.g., other sounds associated with a threat, such as a gunshot, images indicating running, etc.). This corroborating data may be analyzed at step 904 to update the confidence score 726. If the updated confidence score 726 is greater than the threshold value at step 906, the existence of the threat is reported. In some cases, a different vocal phrase associated with the non-existence (or resolution) of a threat may be detected at some point during process 900. The detection of such a vocal phrase may decrease the confidence score that a threat exists.

In some cases, after the existence of a threat is determined, an alert and associated evidence of the threat (e.g., audio and/or visual recordings taken from the space) from a time when or near when the threat was detected) may be provided to a recipient device 730. A user of the recipient device 730 may review the evidence by viewing video, listening to sound, etc. and determine whether the detected threat is really present. The user can confirm or deny the existence of the detected threat. In some cases, this review may be performed before a higher level alert/response is initiated (e.g., to provide an alarm or initiate other response procedures), and the higher level alert/response is only initiated if a threat is confirmed by the user. However, in some cases, a higher level alert/response is automatically initiated. In such cases, if the user confirms the threat, there is no delay in providing a response. If the user denies the existence of the threat, the response can be canceled. The user reviewing the threat and associated evidence may be present at the location where the threat is monitored or at a remote location.

Each operation in the flowchart of FIG. 9 may represent a module, segment, or portion of instructions, which include one or more executable instructions for implementing the specified logical function(s). In some alternative implementations, the functions noted in the block may occur in a different order than is shown in FIG. 9. For example, two operations shown in succession may, in fact, be executed substantially concurrently, or the operations may sometimes be executed in the reverse order, depending upon the functionality involved. It will also be noted that each operation of the flowchart can be implemented by special purpose hardware-based systems that perform the specified functions or acts or carry out combinations of special purpose hardware and computer instructions.

In the description above, words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

It will be apparent to those skilled in the art that modifications and variations can be made in the present disclosure without departing from the spirit or scope of the disclosure. It is intended that the present disclosure covers the modifications and variations provided they come within the scope of the appended claims and their equivalents.

What is claimed is:

1. A threat detection and response system, comprising:

at least one sound sensor configured to sense sound within a detection zone and transmit sound data corresponding to the sensed sound; and a system gateway comprising a processor configured to:

train at least one model to detect an existence of a threat;

following a period of time, retrain the at least one model using real-world background noise data recorded by a sound sensor in the detection zone, wherein the retraining comprises overlaying the real-world background noise data with threat-positive audio data to generate space-specific threat-positive audio data and overlaying the real-world background noise data with threat-negative audio data to generate space-specific threat-negative audio data, and retraining the at least one model using the space-specific threat-positive audio data and the space-specific threat-negative audio data comprising sounds from the detection zone, thereby improving threat detection in the detection zone;

receive the sound data;

analyze the sound data using the at least one model to detect a vocal phrase within the sensed sound;

determine a confidence score for the threat based on an extent to which the detected vocal phrase is correlated to a pre-defined phrase associated with a threat;

further analyze the sound data using the at least one model to detect one or more additional vocal phrases;

determine that at least one of the one or more additional vocal phrases is correlated to the pre-defined phrase associated with the threat;

responsive to determining that at least one of the one or more additional vocal phrases is correlated to the pre-defined phrase associated with the threat, update the confidence score to reflect an increased confidence in an existence of the threat; and communicate a possible existence of the threat to a recipient device after determining the confidence score is greater than a threshold value.

2. The threat detection and response system of claim 1, wherein the processor is further configured to:

determine that multiple individuals spoke the vocal phrase; and responsive to determining that multiple individuals spoke the vocal phrase, update the confidence score to reflect the increased confidence in the existence of the threat.

3. The threat detection and response system of claim 2, wherein the processor is further configured to:

determine that at least one of the one or more additional vocal phrases is correlated to a second pre-defined phrase associated with a non-existence of the threat; and responsive to determining that at least one of the one or more additional vocal phrases is correlated to the second pre-defined phrase associated with the non-existence of the threat, update the confidence score to reflect a decreased confidence in the existence of the threat.

4. The threat detection and response system of claim 2, further comprising:

a second sensor configured to collect second sensor data from within at least a portion of the detection zone and transmit the second sensor data, wherein the second sensor is a motion sensor, a temperature sensor, an image sensor, a light sensor, a sound sensor, a pressure sensor, a gas sensor, a chemical sensor, or a biologic sensor;

wherein the processor is further configured to:

receive the second sensor data; and update the confidence score based on an extent to which the second sensor data corroborates the existence of the threat.

5. The threat detection and response system of claim 1, wherein the at least one sound sensor is positioned indoors or outdoors.

6. The threat detection and response system of claim 1, further comprising a processing unit communicatively coupled to the at least one sound sensor, wherein the processing unit is configured to, prior to transmission of the sound data:

analyze the sound data to detect initial evidence of the vocal phrase within the sensed sound; and after detecting the initial evidence of the vocal phrase, allow or cause the sound data to be transmitted.

7. The threat detection and response system of claim 1, wherein the at least one model comprises a first machine learning model trained using threat-positive audio data and threat-negative audio data, and a second machine learning model trained using threat-positive audio data and threat-negative audio data overlayed with background noise audio data; and wherein the second machine learning model is the model that is retrained using the real-world background noise data recorded by the sound sensor in the detection zone.

8. The threat detection and response system of claim 7, further comprising a third machine learning model trained to detect the existence of the threat using overlayed threat-positive audio data, overlayed threat-negative audio data, and signal-to-noise ratio characteristics, wherein the confidence score is determined based on outputs of two or more models including the third machine learning model.

9. The threat detection and response system of claim 1, wherein a single processor of the system gateway executes model instructions that implement the at least one model and performs the analysis of the sound data to detect the vocal phrase and to determine the confidence score.

10. A threat detection and response method, comprising, by one or more processors:

training at least one model to detect an existence of a threat;

following a period of time, retraining the at least one model using real-world background noise data recorded by a sound sensor in a detection zone, wherein the retraining comprises overlaying the real-world background noise data with threat-positive audio data to generate space-specific threat-positive audio data and overlaying the real-world background noise data with threat-negative audio data to generate space-specific threat-negative audio data, and retraining the at least one model using the space-specific threat-positive audio data and the space-specific threat-negative audio data comprising sounds from the detection zone, thereby improving threat detection in the detection zone;

receiving sound data from at least one sound sensor configured to sense sound within the detection zone;

analyzing the sound data using the at least one model to detect a vocal phrase within the sensed sound;

determining that the detected vocal phrase corresponds to a pre-defined phrase associated with a threat; and communicating an existence of the threat to a recipient device.

11. The threat detection and response method of claim 10, further comprising:

determining a confidence score for the threat based on an extent to which the detected vocal phrase is correlated to the pre-defined phrase; and communicating the existence of the threat to the recipient device if the confidence score is greater than a threshold value.

12. The threat detection and response method of claim 11, further comprising:

further analyzing the sound data to detect one or more additional vocal phrases;

determining that at least one of the one or more additional vocal phrases is correlated to the pre-defined phrase associated with the threat; and responsive to determining that at least one of the one or more additional vocal phrases is correlated to the pre-defined phrase associated with the threat, updating the confidence score to reflect an increased confidence in the existence of the threat.

13. The threat detection and response method of claim 11, further comprising:

receiving second sensor data from a second sensor configured to collect second sensor data from within at least a portion of the detection zone, wherein the second sensor is a motion sensor, a temperature sensor, an image sensor, a light sensor, a sound sensor, a pressure sensor, a gas sensor, a chemical sensor, or a biologic sensor; and updating the confidence score based on an extent to which the second sensor data corroborates the existence of the threat.

14. The threat detection and response method of claim 10, wherein the at least one sound sensor is mounted on or inside a structure.

15. The threat detection and response method of claim 10, wherein the existence of the threat is communicated to the recipient device via a secure communication protocol.

16. The threat detection and response method of claim 10, wherein the recipient device is an alarm system, a mobile communication device, or an access control system.

17. The threat detection and response method of claim 10, wherein the at least one sound sensor is positioned indoors or outdoors.

18. The threat detection and response method of claim 10, further comprising, prior to transmission of the sound data:

analyzing the sound data to detect initial evidence of the vocal phrase within the sensed sound; and after detecting the initial evidence of the vocal phrase, allowing or causing the sound data to be transmitted.

19. A threat detection sensor, comprising:

at least one sound sensor configured to sense sound within a detection zone; and a processor unit coupled to the at least one sound sensor and configured to:

receive sound data generated by the at least one sound sensor;

analyze the sound data to detect initial evidence of a vocal phrase within the sensed sound; and after detecting the initial evidence of the vocal phrase, transmit the sound data corresponding to the sensed sound, wherein the transmitted sound data is used to confirm an existence of a threat by confirming that the vocal phrase is within the sensed sound, wherein the existence of the threat is confirmed using at least one model, wherein after the at least one model is trained, the at least one model is retrained using real-world background noise data recorded by a sound sensor in the detection zone, wherein the retraining comprises overlaying the real-world background noise data with threat-positive audio data to generate space-specific threat-positive audio data and overlaying the real-world background noise data with threat-negative audio data to generate space-specific threat-negative audio data, and retraining the at least one model using the space-specific threat-positive audio data and the space-specific threat-negative audio data comprising sounds from the detection zone, thereby improving threat detection in the detection zone.

20. A threat detection and response system, comprising:

a sound sensor configured to be disposed in a detection zone and to generate sound data representing sound in the detection zone;

a network interface;

a processor in communication with the sound sensor and the network interface; and a memory storing instructions that, when executed by the processor, cause the processor to:

train at least one machine learning model to detect an existence of a threat using threat-positive audio data and threat-negative audio data;

following a period of time, retrain the at least one machine learning model using real-world background noise data recorded by the sound sensor in the detection zone, thereby improving threat detection in the detection zone;

receive, from the sound sensor, the sound data;

analyze the sound data using the at least one machine learning model to detect a vocal phrase associated with the threat;

determine a confidence score representing a likelihood of existence of the threat based on the analysis of the sound data;

receive corroborating sensor data from a second sensor of a different modality than the sound sensor, the second sensor comprising at least one of a motion sensor, an image sensor, a temperature sensor, a light sensor, a pressure sensor, a gas sensor, a chemical sensor, or a biologic sensor;

update the confidence score based on the corroborating sensor data to reflect an increased or decreased confidence in the existence of the threat;

detect the existence of the threat based on the analysis of the sound data and the updated confidence score; and responsive to detecting the existence of the threat, transmit, via the network interface, a message indicative of the threat to a recipient device.

* * * * *